(12) United States Patent
Takemura et al.

(10) Patent No.: US 6,438,096 B1
(45) Date of Patent: *Aug. 20, 2002

(54) OPTICAL DISK AND A RECORDING/REPRODUCTION APPARATUS USING MULTIPLE ADDRESS BLOCK GROUPS SHIFTED OPPOSITELY WITH MULTIPLE ADDRESS BLOCKS AND CLOCK SYNCHRONIZATION

(75) Inventors: Yoshinari Takemura, Settsu; Shigeru Furumiya, Himeji; Takashi Ishida, Yawata; Yoshito Aoki, Moriguchi; Shunji Ohara, Higashiosaka; Yuichi Kamioka, Katano; Toyoji Gushima, Habikino, all of (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/570,615

(22) Filed: May 12, 2000

Related U.S. Application Data

(63) Continuation of application No. 09/171,044, filed as application No. PCT/JP97/01301 on Apr. 15, 1997, now Pat. No. 6,172,960.

(30) Foreign Application Priority Data

Apr. 15, 1996 (JP) ............................... 8-92354
Jun. 6, 1996 (JP) ............................... 8-144033

(51) Int. Cl.⁷ ................................. G11B 7/24
(52) U.S. Cl. ................. 369/275.3; 369/44.41; 369/275.4
(58) Field of Search ...................... 369/275.3

(56) References Cited

U.S. PATENT DOCUMENTS 4,866,688 A    9/1989   Ohtake et al.
4,937,804 A    6/1990   Ishihara (List continued on next page.)

FOREIGN PATENT DOCUMENTS

EP    0588305    3/1994

(List continued on next page.)

OTHER PUBLICATIONS

European Search Report, Application No. 00104070.8–2210 dated Jul. 13, 2001.
European Office Action dated Oct. 19, 1999 corresponding to European Patent Application No. 97915726.0.
European Search Report related to European Patent Application No. 97915726.0 dated Aug. 30, 1999.
International Search Report with Partial English Translation dated Jul. 8, 1997 with Respect to Application No. PCT/JP97/01301.

*Primary Examiner*—Aristotelis M. Psitos
(74) *Attorney, Agent, or Firm*—Renner, Otto, Boisselle & Sklar

(57) ABSTRACT

Address groups are composed of two of address blocks 16, 17, 18, and 19, where the address blocks 16, 17, 18, and 19 are disposed in a sector address region 5 and include identifiable information of address numbers 13 and overlapping sequential numbers 14. The address groups are disposed so that each group is alternately shifted from a track center 2 toward the inner periphery side or the outer periphery side, by a width substantially equal to half the track pitch, along the radius direction.

3 Claims, 26 Drawing Sheets

Data arrangement in address blocks

U.S. PATENT DOCUMENTS

| | | | |
|---|---|---|---|
| 5,257,149 A | 10/1993 | Meyer | 360/78.14 R |
| 5,258,968 A | 11/1993 | Matsuda et al. | |
| 5,295,131 A | 3/1994 | Ishibashi et al. | |
| 5,444,582 A | 8/1995 | Suzuki | |
| 5,452,284 A * | 9/1995 | Miyagawa et al. | 369/275.3 X |
| 5,493,552 A | 2/1996 | Kobori | |
| 5,740,154 A | 4/1998 | Izumi et al. | |
| 5,805,565 A | 9/1998 | Miyamoto et al. | |
| 5,838,658 A | 11/1998 | Nakane et al. | |
| 5,850,382 A * | 12/1998 | Koishi et al. | 369/275.3 X |
| 5,862,112 A * | 1/1999 | Nagai et al. | 369/275.3 X |
| 5,862,115 A | 1/1999 | Nagai et al. | 369/275.3 X |
| 5,872,767 A | 2/1999 | Nagai et al. | 369/275.3 R |
| 5,923,640 A * | 7/1999 | Takemura et al. | 369/275.3 X |
| 5,936,932 A * | 8/1999 | Nakane et al. | 369/275.3 R |
| 5,949,745 A | 9/1999 | Kim | |
| 5,991,243 A | 11/1999 | Ishi et al. | |
| 6,072,754 A * | 6/2000 | Izumi | 369/275.3 X |
| 6,172,960 B1 * | 1/2001 | Takemura et al. | 369/275.3 |

FOREIGN PATENT DOCUMENTS

| | | | |
|---|---|---|---|
| EP | 0628952 | 12/1994 | |
| EP | 0637018 | 2/1995 | |
| EP | 0656625 | 6/1995 | |
| EP | 0727779 | 8/1996 | |
| EP | 0 757 343 | 2/1997 | |
| EP | 0757343 | 2/1997 | |
| JP | 61151842 | 7/1986 | |
| JP | 62239324 | 10/1987 | |
| JP | 62271227 | 11/1987 | |
| JP | 63220483 | 9/1988 | |
| JP | 6419561 | 1/1989 | 369/275.3 |
| JP | 6 060431 | 3/1994 | |
| JP | 06096447 | 4/1994 | |
| JP | 6 176404 | 6/1994 | |
| JP | 06176404 | 6/1994 | |
| JP | 7 050014 | 2/1995 | |

* cited by examiner

Schematic view of optical disk of Example 1

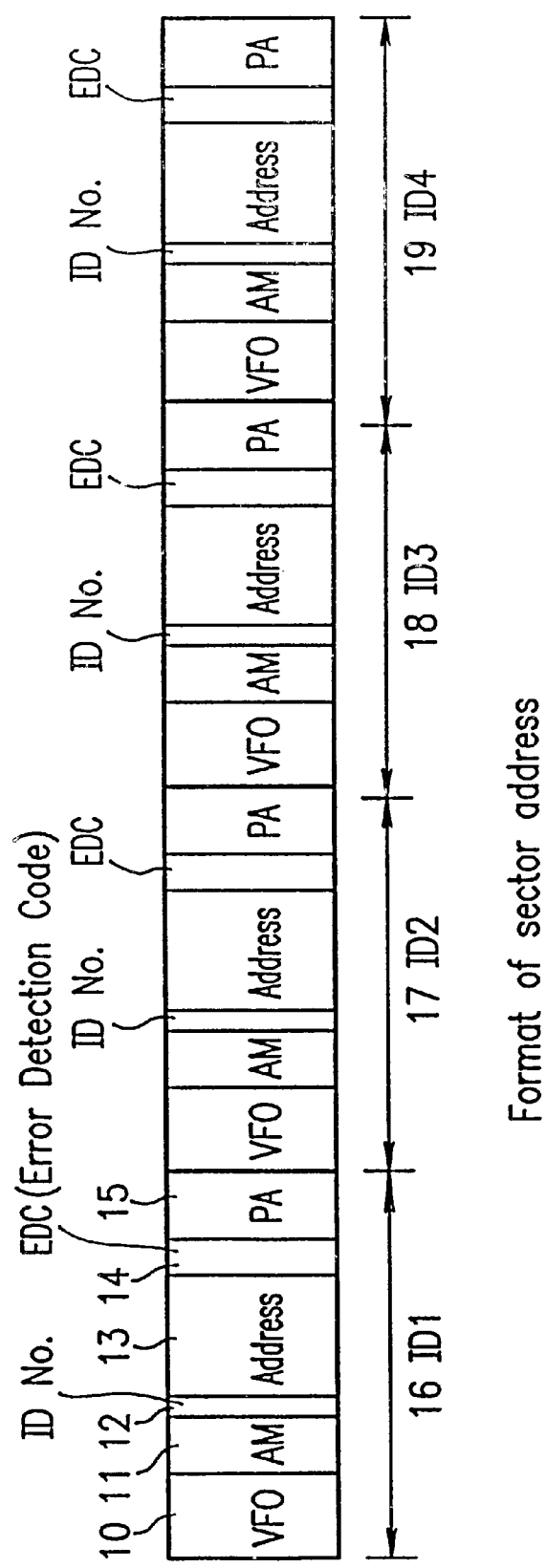

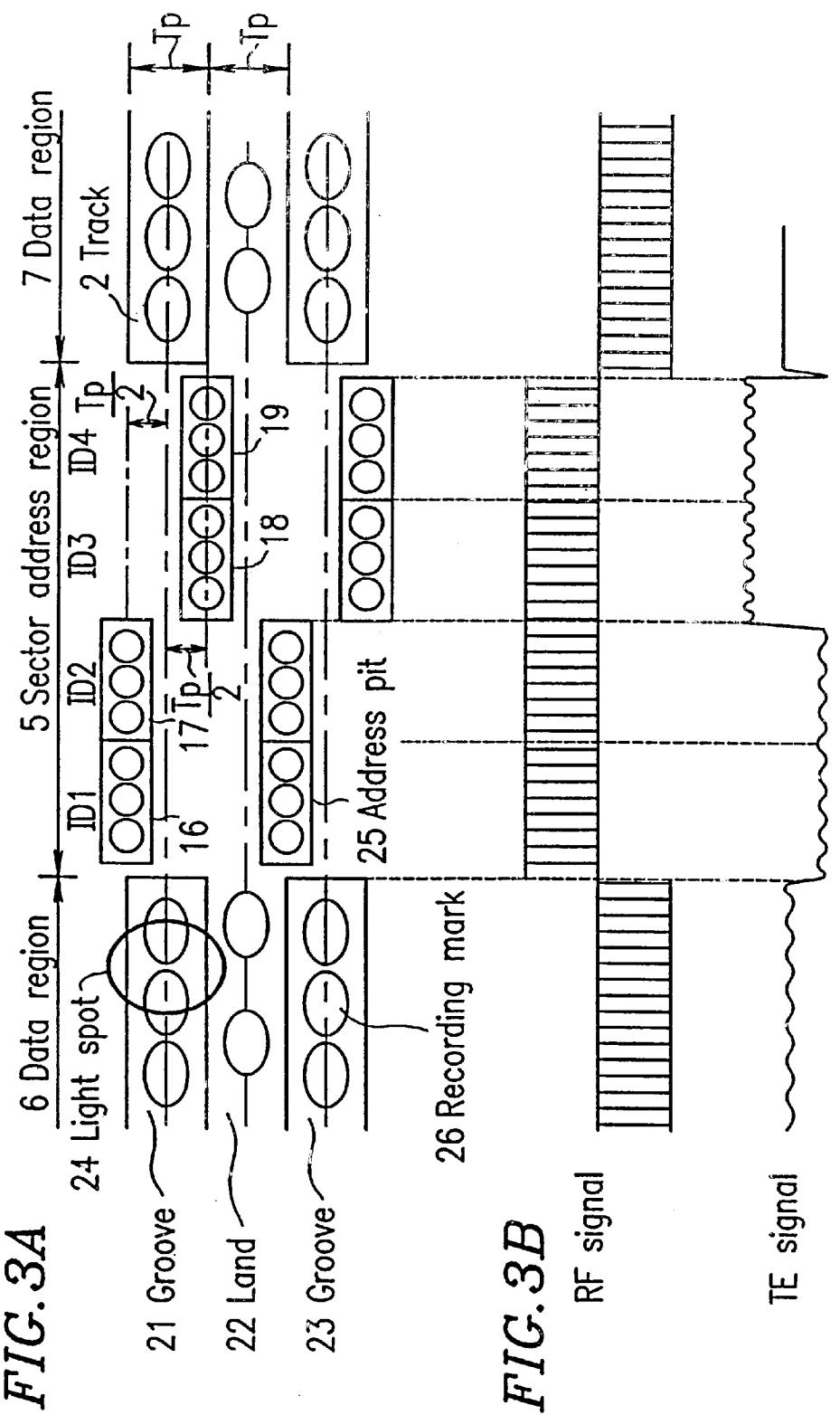

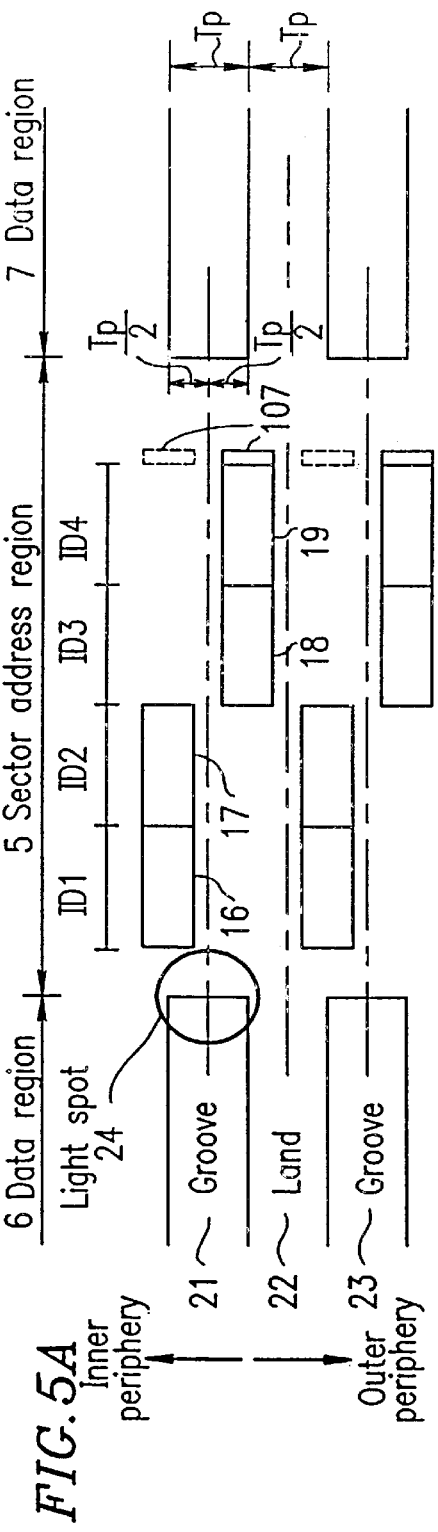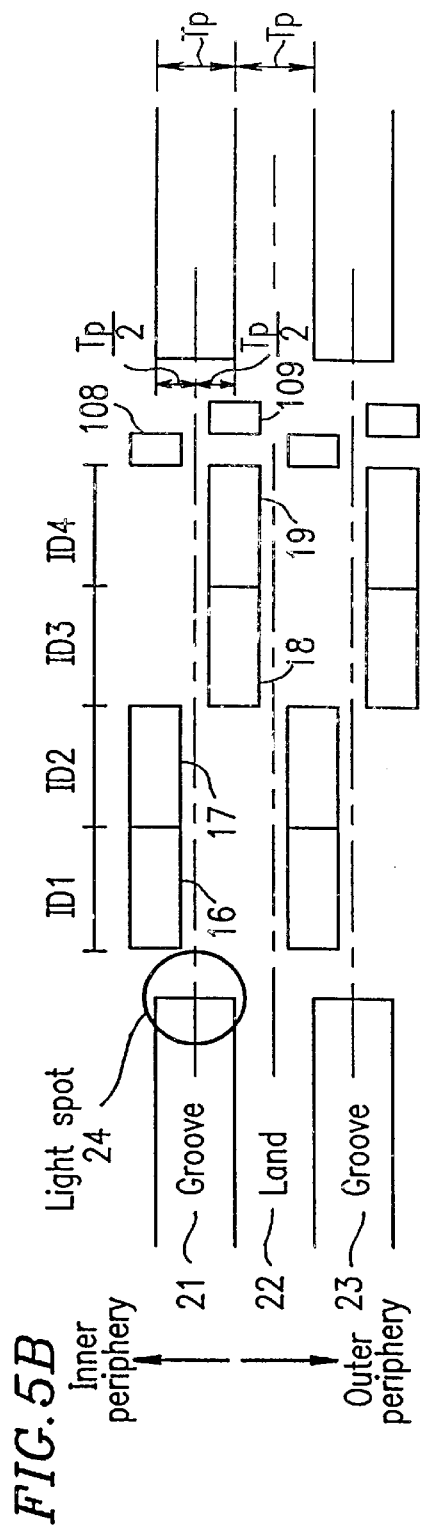
FIG.5A Arrangement of address blocks in Example 2
FIG.5B Arrangement of address blocks in Example 2

Address block arrangement
Arrangement of address blocks in Example 3

Pit arrangement between address blocks
Arrangement of address blocks in Example 3

Proper pit configuration
Connection portion between address groups

Pits actually formed
Connection portion between address groups

Reproduction of connection portion between address groups where pits overlap

Reproduction of connection portion between address groups where there is non-pit data

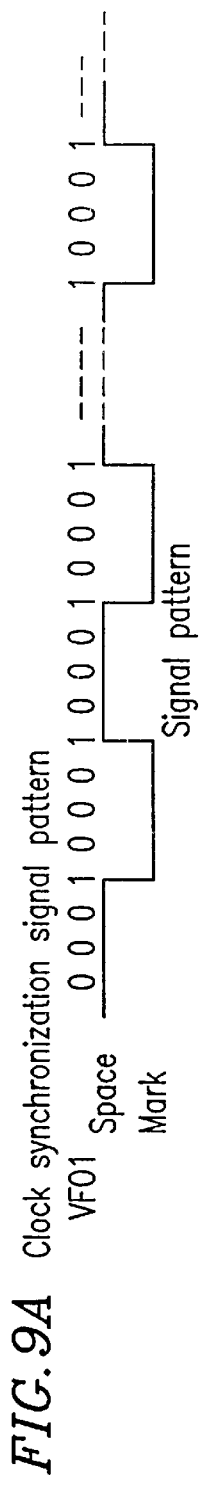
FIG. 9A Clock synchronization signal pattern
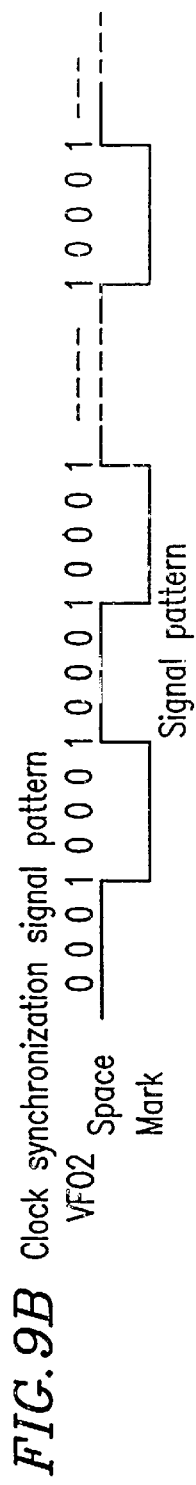
FIG. 9B Clock synchronization signal pattern
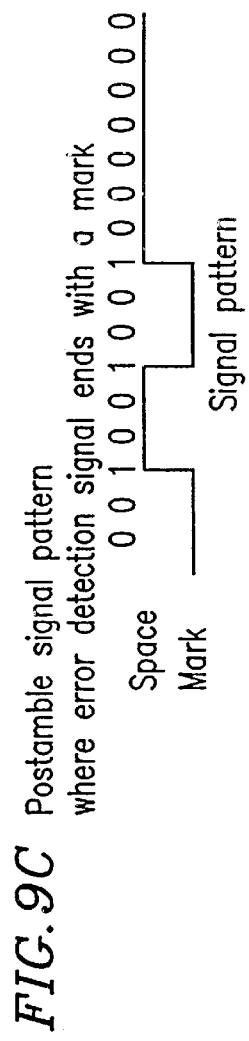
FIG. 9C Postamble signal pattern where error detection signal ends with a mark
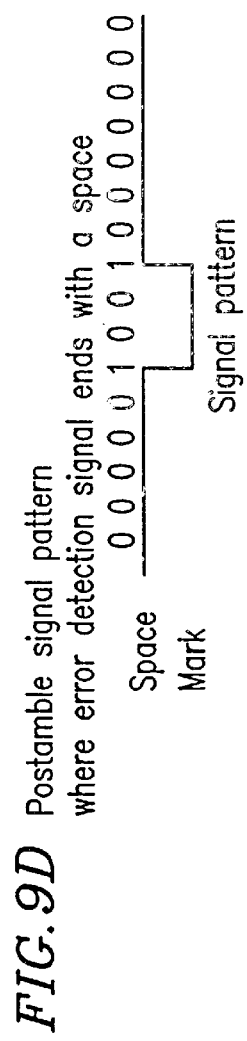
FIG. 9D Postamble signal pattern where error detection signal ends with a space

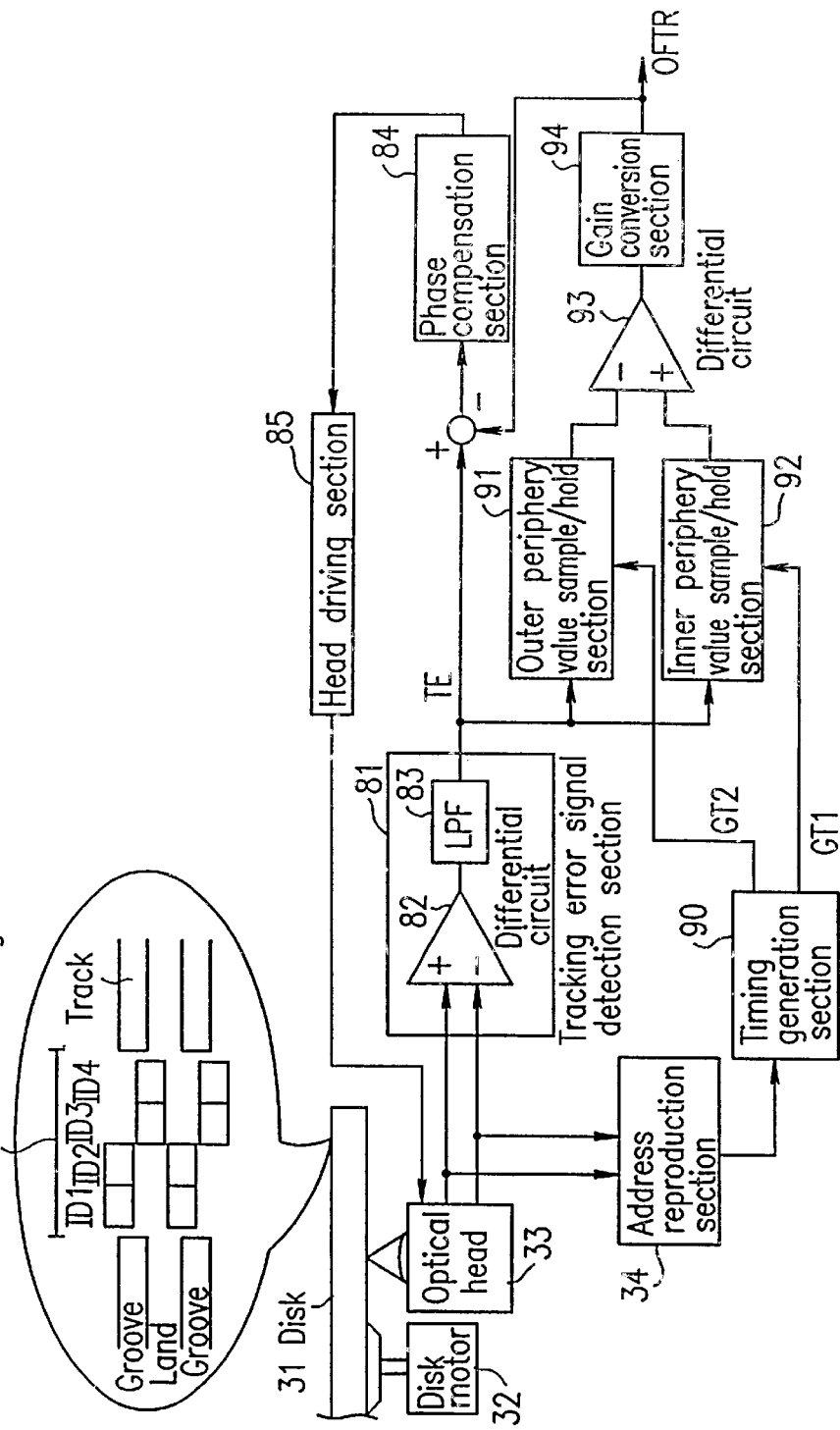
FIG. 14  Block diagram of optical disk recording/reproduction apparatus of Example 7

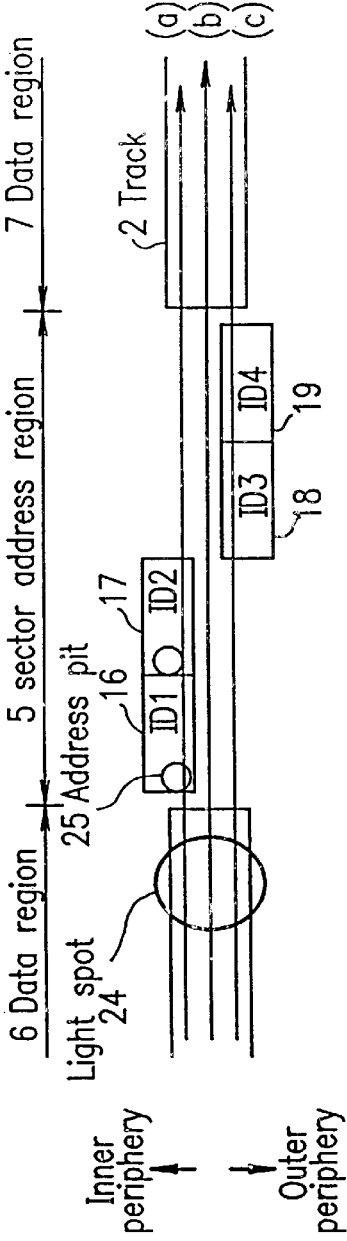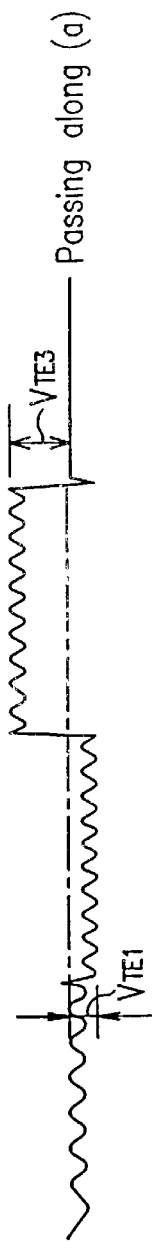
FIG. 15A
FIG. 15B
FIG. 15C
FIG. 15D

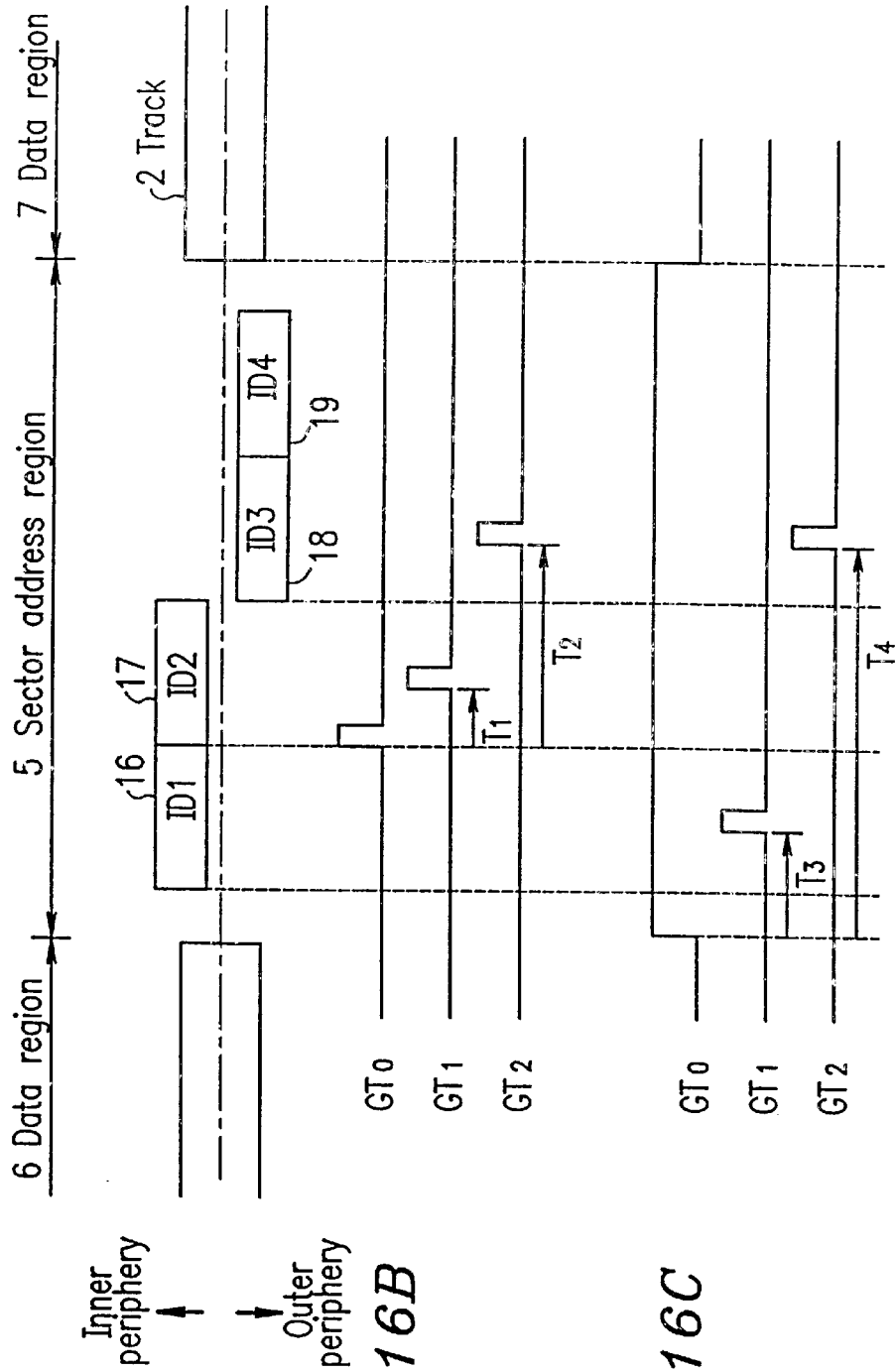

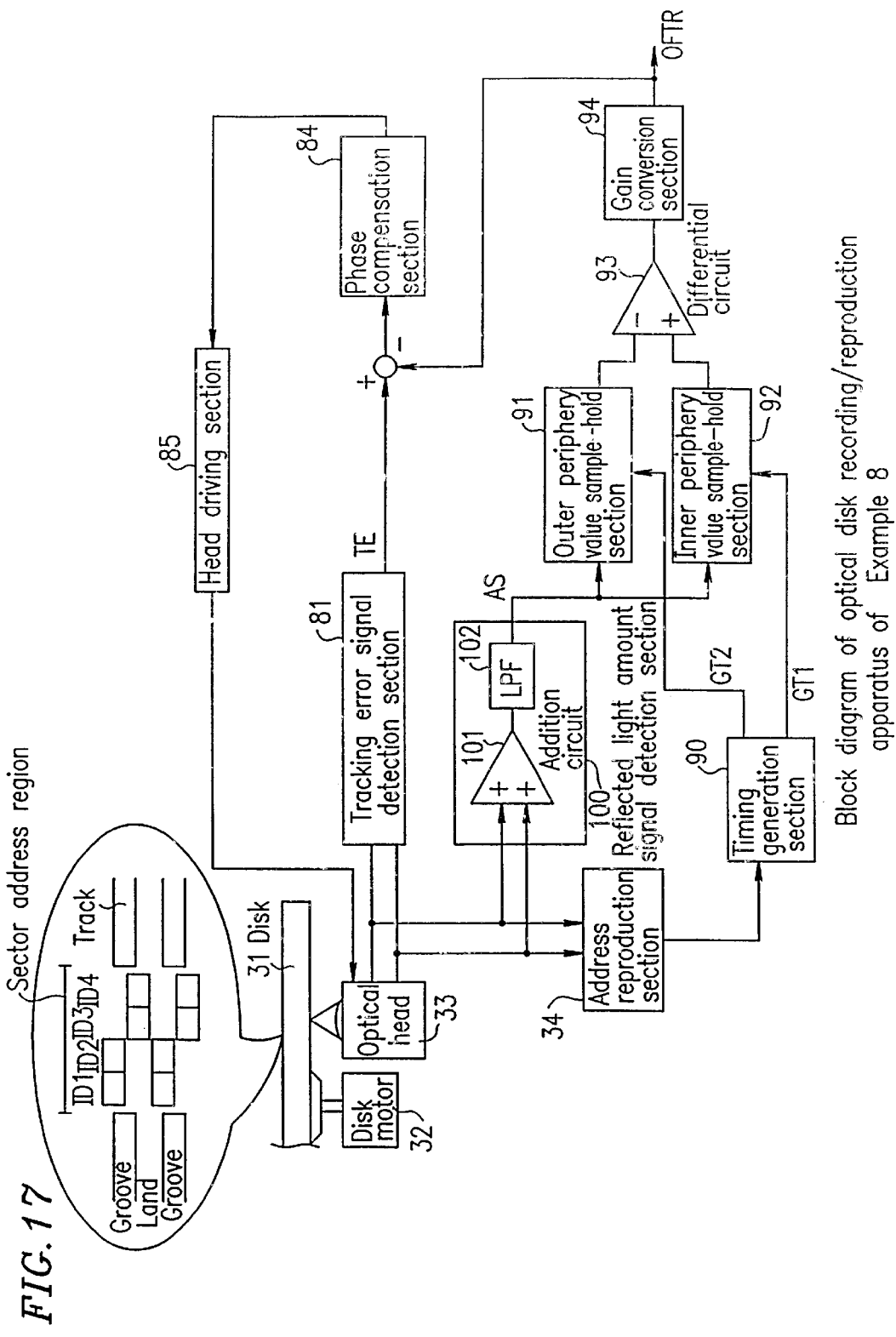
FIG.17    Block diagram of optical disk recording/reproduction apparatus of Example 8

Light beam scanning
(Groove tracking)

Tracking error signal

High pass filter output

After full-wave rectification

First low pass filter output

Second and third low pass filter output

Envelope signal

Polarity signal

FIG. 20A
Light beam scanning
(Land tracking)
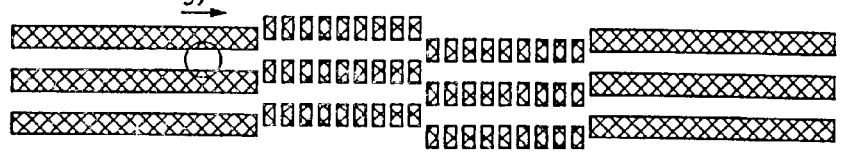
FIG. 20B
Tracking error signal
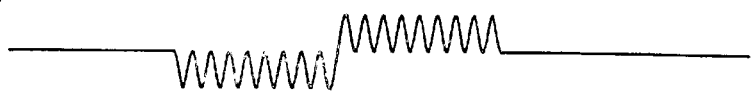
FIG. 20C
High pass filter output
FIG. 20D
After full-wave rectification
FIG. 20E
First low pass filter output — Reference voltage
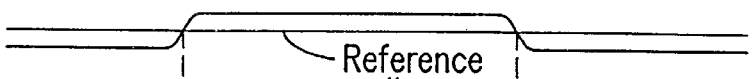
FIG. 20F
Second and third low pass filter output
Second low frequency component | Third low frequency component
FIG. 20G
Envelope signal
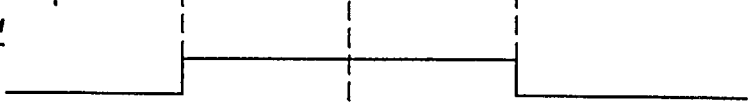
FIG. 20H
Polarity signal   Unknown            Unknown

Track structure of a recording/reproduction option disk

OPTICAL DISK AND A RECORDING/ REPRODUCTION APPARATUS USING MULTIPLE ADDRESS BLOCK GROUPS SHIFTED OPPOSITELY WITH MULTIPLE ADDRESS BLOCKS AND CLOCK SYNCHRONIZATION

This is a continuation of copending application Ser. No. 09/171,044, filed Jan. 4, 1999 now U.S. Pat. No. 6,172,960 which was filed as PCT/JP97/01301 filed Apr. 15. 1997.

TECHNICAL FIELD

The present invention relates to a recordable/reproducible optical disk, in which information pit arrays of sector addresses are disposed so as to wobble between a land track and a groove track; and an optical disk recording/ reproduction apparatus for performing recording and/or reproduction for the optical disk.

BACKGROUND ART

Optical disks have excellent removability/portability and random access performance. Therefore, it has become more and more prevalent to employ optical disks as memories in various information equipment fields, e.g., personal computers. As a result, there has been an increasing demand for increasing the recording capacitance of optical disks.

In general, guide grooves for tracking control purposes are formed on rewritable optical disks, so that data is recorded and reproduced by utilizing the guide grooves as tracks. In addition, a track is divided into a plurality of sectors for sector-by-sector management of data. Therefore, in the production of such disks, address information for each sector is often formed in the form of pits while forming the guide grooves.

In currently prevalent rewritable optical disks, tracks for recording data are either the grooves formed during the disk formation (grooves) or the interspaces between grooves (lands). On the other hand, optical disks of a land-groove recording type for recording data on both the grooves and the lands have also been proposed.

FIG. 22 illustrates an exemplary optical disk of the land-groove recording type. As used herein, the portions which are located closer to the optical disk surface are referred to as "grooves", whereas the portions which are located further away from the optical disk surface are referred to as "lands", as shown in FIG. 22. It should be noted that "lands" and "grooves" are mere names; therefore, the portions which are located closer to the optical disk surface may be referred to as "lands", while the portions which are located further away from the optical disk surface may be referred to as "grooves".

An optical disk of the land-groove recording type requires sector addresses for both the lands and the grooves. In order to facilitate the process of forming address pits on an optical disk, an intermediate address method has been studied in which address pits are formed between a land and a groove adjoining each other so that the same address is shared by the adjoining tracks (Japanese Laid-Open Publication No. 6-176404).

Hereinafter, the intermediate address, a tracking control method for reading information from an optical disk, and a method for reading signals from an intermediate address will be described with reference to the figures.

FIG. 23 is a schematic diagram showing an optical disk having a sector structure. In FIG. 23, reference numeral 200 denotes a disk; reference numeral 201 denotes a track; reference numeral 202 denotes a sector; reference numeral 203 denotes a sector address region; and reference numeral 204 denotes a data region. FIG. 24 is a magnified view of a sector address region schematically showing a conventional intermediate address. In FIG. 24, reference numeral 206 denotes address pits; reference numeral 207 denotes recording marks; 208 denotes a groove track; reference numeral 209 denotes a land track; and reference numeral 210 denotes a light spot.

In the optical disk shown in FIG. 24, the groove 208 and the land 209 are employed as tracks. Data signals can be recorded by forming the recording marks 207 on the groove 208 and the land 209. The groove track 208 and the land track 209 have the same track pitch Tp. The center of each address pit 206 is shifted by Tp/2 from the center of the groove track 208 along the radius direction. In other words, each address pit 206 is centered around the boundary between the groove 208 and the land 209. Although the lengths or intervals of the address pits 206 are modulated by an address signal, FIG. 24 only schematically illustrates the shapes of the address pits 206.

FIG. 25 is a block diagram showing the conventional tracking control and the signal processing for reading signals on an optical disk.

The structure shown in FIG. 25 will be described below, In FIG. 25, reference numeral 200 denotes a disk; reference numeral 201 denotes a track; reference numeral 210 denotes a light spot; and reference numeral 211 denotes a disk motor for rotating the disk 200. An optical head 212 optically reproduces a signal on the disk 200. The optical head 212 includes a semiconductor laser 213, a collimation lens 214, an object lens 215, a half mirror 216, photosensitive sections 217a and 217b, and an actuator 218. A tracking error signal detection section 220 detects a tracking error signal indicating the amount of dislocation between the light spot 210 and the track 201 along the radius direction. The tracking error signal detection section 220 includes a differential circuit 221 and a LPF (low pass filter) 222. A phase compensation section 223 generates a drive signal from a tracking error signal for driving the optical head. A head driving section 224 drives the actuator 218 in the optical head 212 in accordance with the drive signal.

An address reproduction section 234 includes an addition circuit 225, a waveform equalization section 226, a data slice section 227, a PLL (phase locked loop) 228, an AM detection section 229, a demodulator 230, a switcher 231, and an error detection section 232. The addition circuit 225 adds signals from the photosensitive sections 217a and 217b. The waveform equalization section 226 prevents the inter-sign interference of a reproduced signal. The data slice section 227 digitizes the reproduced signal at a predetermined slice level. The PLL (Phase Locked Loop) 228 generates a clock which is in synchronization with the digitized signal. The AM detection section 229 detects AMs (address marks). The demodulator 230 demodulates the reproduced signal. The switcher 231 separates the demodulated signal into data and an address. The error detection section 232 performs an error determination in the address signal. An error correction section 233 corrects errors in the data signal.

Hereinafter, an operation for tracking control will be described. Laser light radiated from the semiconductor laser 213 is collimated by the collimate lens 214 and converged on the disk 200 via the object lens 215. The laser light reflected from the disk 200 returns to the photosensitive sections 217a and 217b via the half mirror 216, whereby the distribution of light amount is detected as an electric signal, which is determined by the relative positions of the light spot 210 and the track 201 on the disk. In the case of using the two-divided photosensitive sections 217a and 217b, a tracking error signal is detected by detecting a difference between the photosensitive sections 217a and 217b by means of the differential circuit 221 and extracting a low frequency component of the differential signal by means of the LPF 222. In order to ensure that the light spot 210 follows the track 201, a drive signal is generated in the phase compensation section 223 such that the tracking error signal becomes 0 (i.e., the photosensitive sections 217a and 217b have the same distribution of light amount), and the actuator 218 is moved by the head driving section 224 in accordance with the drive signal, thereby controlling the position of the object lens 215.

On the other hand, when the light spot 210 follows the track 201, the amount of reflected light is reduced at the recording marks 207 and at the address pits 206 on the track owing to interference of light, thereby lowering the outputs of the photosensitive sections 217a and 217b, whereas the amount of reflected light increases where pits do not exist, thereby increasing the outputs of the photosensitive sections 217a and 217b. The total light amount of the output from the photosensitive sections which corresponds to the recording marks 207 and address pits 206 is derived by the addition circuit 225, led through the waveform equalization section 226 so as to remove the inter-sign interference of the reproduced signal, and digitized at a predetermined slice level at the data slice section 227 so as to be converted into a signal sequence of "0" and "1". Data and a read clock are extracted from this digitized signal by the PLL 228. The demodulator 230 demodulates the recorded data which has been modulated, and converts it into a data format which allows for external processing. If the demodulated data is a signal in the data region, the errors in the data are corrected in the error correction section 233, whereby a data signal is obtained. On the other hand, if the AM detection section 229 detects an AM signal for identifying the address portions in a signal sequence that is constantly output from the PLL 228, the switcher 231 is switched so that the demodulated data is processed as an address signal. The error detection section 232 determines whether or not the address signal which has been read includes any errors; if no error is included, the address signal is output as address data.

FIG. 26 shows the states of a reproduced signal (RF signal) and a tracking error signal (TE signal) when the light spot 210 passes the sector address region 203 in the above-described configuration. Although the light spot 210 is on the center of the track in the data region 204, a drastic dislocation occurs between the light spot 210 and the address pits 206 immediately after the light spot 210 enters the sector address region 203, thereby greatly fluctuating the level of the TE signal. The light spot 210 cannot rapidly follow the address pits but gradually comes closer to the address pits, as indicated by the broken line. However, since the sector address region 203 is short and the data region 205 (which is a grooved region) is reached before the light spot 210 manages to completely follow the address pits, a tracking control is performed so that the off-tracking becomes zero in the grooved region. The amount of off-tracking in the last portion of the sector address region is defined as Xadr. Moreover, since a portion of the light spot 210 is on the address pits 207, an RF signal as shown in FIG. 26 is obtained. The RF signal amplitude Aadr varies in accordance with the distance between the light spot 210 and the address pits 206. Specifically, Aadr decreases as the distance becomes larger, and increases as the distance becomes smaller.

DISCLOSURE OF THE INVENTION

In the case where the address pits of intermediate addresses are provided in only one direction along the radial direction, the distance between the light spot and the address pits may also vary in the sector address region in the case where the center of the light spot is dislocated from the center of the track in the data region. As a result, there is a problem in that, although the amplitude of the reproduced signal in the address pit region will increase if the light spot is shifted closer to the address pits, the amplitude of the reproduced signal in the address pit region will decrease if the light spot is shifted away from the address pits, thereby resulting in an insufficient reading of the address.

There is also a problem in that, since the synchronization of the read clock and the setting of the slice level for digitization are to be performed in the beginning portion of an address region, the reproduction of the beginning portion must become stable; otherwise proper demodulation cannot occur even if a reproduction signal is obtained elsewhere.

There is also a problem in that, since the light spot is dislocated from the address pits in the sector address region, a large fluctuation in level, which does not indicate the actual track offset amount, occurs in the tracking error signal. Since the tracking control is performed by using such a tracking error signal, a tracking offset may occur after the light spot has passed the sector address section.

There is also a problem in that, since the same address pits are read for a land track and a groove track adjoining each other, it is impossible to identify whether or not a track which is currently being followed is a land track or a groove track.

In view of the above-mentioned problems, the present invention has an objective of providing an optical disk having a novel address pit arrangement in sector address sections such that insufficient reading of address signals due to tracking offset is reduced and the tracking offset after passing a sector address is reduced, the optical disk further enabling identification of land tracks and groove tracks; an optical disk recording/reproduction apparatus employing such an optical disk; and an optical disk recording/reproduction apparatus including an ID detection circuit for optical disks capable of accurately detecting the locations and polarities of ID sections.

The optical disk recording/reproduction apparatus includes an apparatus for recording data on an optical disk, an apparatus for reproducing data recorded on an optical disk, and an apparatus for recording data on an optical disk and reproducing data recorded on an optical disk.

The optical disk according to the present invention is a land-groove optical disk including a plurality of sectors having a sector address and a data region, the sector address indicating a sector position, wherein the sector address includes a plurality of address blocks, at least four of the plurality of address blocks each containing an address number and an overlapping sequential number; each two of the at least four of the plurality of address blocks make a group; and the respective groups of address blocks are in an alternating arrangement from a track center between being shifted toward an inner periphery side and toward an outer periphery side, by a width substantially equal to half a track pitch, along a radius direction. As a result, the above-mentioned objectives are met.

The sector address may include a block containing information other than the address number and the overlapping sequential number; and the block may be disposed so as to be shifted from the track center toward one of the inner periphery side and the outer periphery side, by the width substantially equal to half the track pitch, along the radius direction.

The sector address may include at least two blocks containing information other than the address number and the overlapping sequential number; and the blocks may be disposed so that one of the at least two blocks is shifted from the track center toward the inner periphery side, and the other of the at least two blocks is shifted toward the outer periphery side, by the width substantially equal to half the track pitch, along the radius direction.

Preferably, a first pattern and a last pattern of each address block includes non-address pit data.

At least four of the plurality of address blocks may contain data of a clock synchronization signal; and data of the clock synchronization signal contained in a first address block of each group may have a length longer than lengths of the clock synchronization signals contained in other address blocks of the group.

An optical disk recording/reproduction apparatus includes: an optical head for radiating a light beam on the aforementioned optical disk and receiving reflected light therefrom to output a reproduced signal; an address signal reproduction section for reading the address numbers and the overlapping sequential numbers when reproducing the sector addresses of the optical disk; and an address correction section for correcting, with respect to each address block, the address numbers which have been read in accordance with the overlapping sequential numbers which have been read. As a result, the above-mentioned objectives are met.

Another optical disk recording/reproduction apparatus according to the present invention includes: the aforementioned optical disk; a tracking error signal detection section for detecting a tracking error signal indicating an offset amount between a track and a light spot; a timing generation section for generating gate signals in synchronization with the respective address blocks of the sector address; an outer periphery value sample-hold section for sampling and holding, in synchronization with the gate signal, a level of the tracking error signal with respect to an address block disposed on the outer periphery side; an inner periphery value sample-hold section for sampling and holding a level of the tracking error signal with respect to an address block disposed on the inner periphery side; a differential circuit for deriving a difference in values of the outer periphery value sample-hold section and the inner periphery value sample-hold section; and gain conversion section for converting the output of the differential circuit to a predetermined signal level. As a result, the above-mentioned objectives are met.

Still another optical disk recording/reproduction apparatus according to the present invention includes: the aforementioned optical disk; a reflected light amount signal detection section for detecting a reflected light amount from the optical disk; a timing generation section for generating gate signals in synchronization with the respective address blocks of the sector address; an outer periphery value sample-hold section for sampling and holding, in synchronization with the gate signal, a level of the reflected light amount signal with respect to an address block disposed on the outer periphery side; an inner periphery value sample-hold section for sampling and holding a level of the reflected light amount signal with respect to an address block disposed on the inner periphery side; a differential circuit for deriving a difference in values of the outer periphery value sample-hold section and the inner periphery value sample-hold section; and gain conversion section for converting the output of the differential circuit to a predetermined signal level. As a result, the above-mentioned objectives are met.

An optical recording/reproduction apparatus including an ID detection circuit for an optical disk according to the present invention includes: a tracking error detection circuit including split detectors for obtaining a tracking error signal for the aforementioned optical disk and a broad-band differential amplifier for outputting a differential component between detected signals from the split detectors as a tracking error detection circuit; an envelope detection circuit including a high pass filter for extracting a high frequency component of the tracking error signal, a full-wave rectifier for applying full-wave rectification to the high frequency component, a first low pass filter for extracting a low frequency fluctuation component of the full-wave rectified high frequency component, and a first comparator for comparing the low frequency fluctuation component and a reference voltage to output an ID envelope signal; a polarity detection circuit including a second low pass filter for extracting a second low frequency component from the tracking error signal, a third low pass filter for extracting a third low frequency component from the tracking error signal, the third low frequency component having a smaller band width than that of the second low frequency component, and a second comparator for comparing the second low frequency component and the third low frequency component to output an ID polarity signal; and a logic circuit for outputting a read gate and a land-groove identification signal from the envelope signal and the polarity signal. As a result, the above-mentioned objectives are met.

BRIEF DESCRIPTION OF THE DRAWINGS

FIG. 2 is a diagram illustrating the format of sector addresses.

FIG. 3A is a diagram showing a portion of a data region and a sector address region.

FIG. 3B is a diagram illustrating an RF signal and a TE signal in a sector address region.

FIG. 5A is a diagram showing the arrangement of address blocks according to Example 2.

FIG. 5B is a diagram showing the arrangement of address blocks according to Example 2.

FIG. 9A shows an exemplary data waveform.

FIG. 9B shows an exemplary data waveform.

FIG. 9C shows an exemplary data waveform.

FIG. 9D shows an exemplary data waveform.

FIG. 14 is a block diagram showing an exemplary optical disk recording/reproduction apparatus.

FIG. 15A is a schematic diagram showing the change in a tracking error signal (TE signal) in response to off-tracking in a sector address region 5.

FIG. 15B is a diagram showing a TE signal in the case where the spot proceeds as (a) on a track 2.

FIG. 15C is a diagram showing a TE signal in the case where the spot proceeds as (b) on a track 2.

FIG. 15D is a diagram showing a TE signal in the case where the spot proceeds as (c) on a track 2.

FIG. 16A is a diagram showing a portion of a data region and a sector address region.

FIG. 16B is a diagram of a timing chart illustrating the generation of gate signals in a timing generation section.

FIG. 16C is a diagram of a timing chart illustrating the generation of gate signals in a timing generation section.

FIG. 17 is a block diagram showing an optical disk recording/reproduction apparatus according to Example 8.

FIG. 20A is a diagram showing an ID section which is disposed in a symmetrical manner in a middle position between a land and a groove.

FIG. 20B is a diagram showing a tracking error signal obtained when scanning with a light beam.

FIG. 20C is diagram showing a signal obtained after a tracking error signal has passed through a high pass filter.

FIG. 20D is a diagram showing a signal obtained by applying full-wave rectification with a full-wave rectifier to a signal which has passed through a high pass filter.

FIG. 20E is a diagram showing a signal obtained after a full-wave rectified signal has passed through a first low pass filter.

FIG. 20F is a diagram showing a signal which has passed through second and third low pass filters.

FIG. 20G is a diagram showing an envelope signal in an ID section.

FIG. 20H is a diagram showing a polarity signal.

BEST MODES FOR CARRYING OUT THE INVENTION

Hereinafter, examples of the present invention will be described with reference to the figures.

EXAMPLE 1

Figure 1:
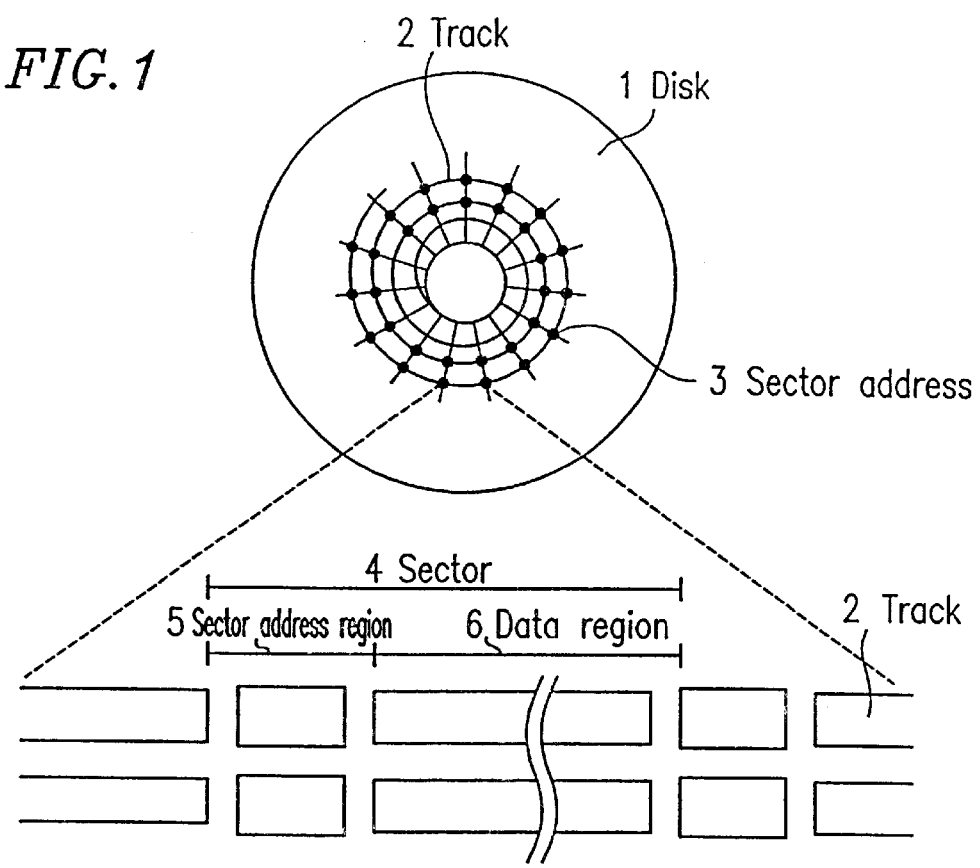
FIG. 1 is a schematic view showing an optical disk according to Example 1.

FIG. 1 shows the outlook of an optical disk according to Example 1 of the present invention. In FIG. 1, reference numeral 1 denotes a disk; reference numeral 2 denotes a track; reference numeral 3 denotes a sector address; reference numeral 4 denotes a sector; reference numeral 5 denotes a sector address region; and reference numeral 6 denotes a data region.

In accordance with a predetermined physical format, a plurality of sectors are successively disposed on a disk 1 along a track 2, each sector defining one unit. Each sector 4 is composed of a sector address region 5 indicating the position of that sector on the disk and a data region 6 for actually recording data.

FIG. 2 shows an exemplary logical format of a sector address. A sector address includes a plurality of address blocks. Each address block has an address number and a overlapping sequential number. The address number and the overlapping sequential number are composed of identifiable information. A value which is unique to each address block is written to the overlapping sequential number.

In the present example, each sector address includes four address blocks sharing the same format. The address blocks are indicated as ID1 to ID4, respectively, from the beginning of the sector address.

In FIG. 2, reference numeral 10 denotes a clock synchronization signal (VFO); reference numeral 11 denotes an address mark (AM); reference numeral 12 denotes an overlapping sequential number (ID number); reference numeral 13 denotes the address number of the sector; reference numeral 14 denotes an error detection code (EDC); and reference numeral 15 denotes a postamble (PA). Reference numerals 16, 17, 18, and 19 denote respective address blocks. Each address block includes the VFO 10, the AM 11, the ID number 12, the address number 13, the EDC 14, and the PA 15.

In the VFO 10, a clock synchronization signal is recorded which has a continuous repetition pattern for ensuring secure reproduction of an address signal in spite of possible fluctuation in the disk rotation. A clock for reading data is generated by locking a PLL (Phase Locked Loop) to this pattern. In the AM 11, an address mark composed of a specific code pattern for indicating the start point of the address data is recorded. In the ID number 12, a number (overlapping sequential number) which is unique to each address block is recorded. In the address number 13, address data indicating some or all of the positions on the disk at which sectors corresponding to that address number are located is recorded. In the EDC 14, an error detection code generated from an address number and an ID number is recorded. The PA 15 is a postamble for ensuring that the last data of the error detection code conforms to the rules of the modulation code during recording.

In the present example, each address block has the format shown in FIG. 2. The address block according to the present invention can have any format as long as they contain the most indispensable information, e.g. an address number and an overlapping sequential number (ID number). Furthermore, the address block according to the present invention can include additional information as well as a clock synchronization signal, an address mark, an overlapping sequential number, an address number, an error detection code, and a postamble as described above.

FIG. 3A shows the arrangement of address blocks in a sector address region. Reference numeral 5 denotes a sector address region, whereas reference numerals 6 and 7 denote data regions. Reference numerals 21 and 23 denote groove tracks; reference numeral 22 denotes a land track; reference numeral 24 denotes a light spot; reference numeral 25 denotes an address pit; and reference numeral 26 denotes a recording mark. It is assumed that the track width of one track is Tp for both the land tracks and the groove tracks. It is assumed that the address blocks ID1 and ID2 make one address group and that the address blocks ID3 and ID4 make another address group. Each address group is shifted from the track center by Tp/2 along the radius direction. Specifically, one address group is shifted by Tp/2 toward the center of the optical disk (inner periphery), whereas the other address group is shifted by Tp/2 away from the center of the optical disk (outer periphery). Alternatively, the one address group can be shifted by Tp/2 away from the center of the optical disk, whereas the other address group can be shifted by Tp/2 toward the center of the optical disk.

FIG. 3B shows the waveforms of a reproduction signal (RF signal) and a tracking error signal (TE signal) obtained when the light spot reproduces a sector address section. In general, the amplitude of the RF signal takes a value which is substantially in proportion with the area which the light spot 24 occupies in the address pit 25. For example, when the light spot 24 is at the center of the track, the light spot 24 illuminates substantially the same area of the address pits 25 of the address blocks ID1 and ID2 as the area of the address pits 25 of the address blocks ID3 and ID4 that is illuminated. Thus, an RF signal having substantially the same amplitude can be obtained, as shown in FIG. 3B.

In the data regions 6 and 7 of grooves, the TE signal takes values which are in proportion with the amount of offset between the light spot 24 and the track groove. Similarly, in the sector address region 5 composed of pits, the TE signal takes values which are in proportion with the amount of offset between the light spot and the pits. Moreover, the polarity of the TE signal changes depending on whether the pits 25 are located on the inner periphery side or the outer periphery side of the light spot 24. Accordingly, the resultant TE signal has different polarities depending on the location of the address block as shown in FIG. 3B.

Figure 4A:
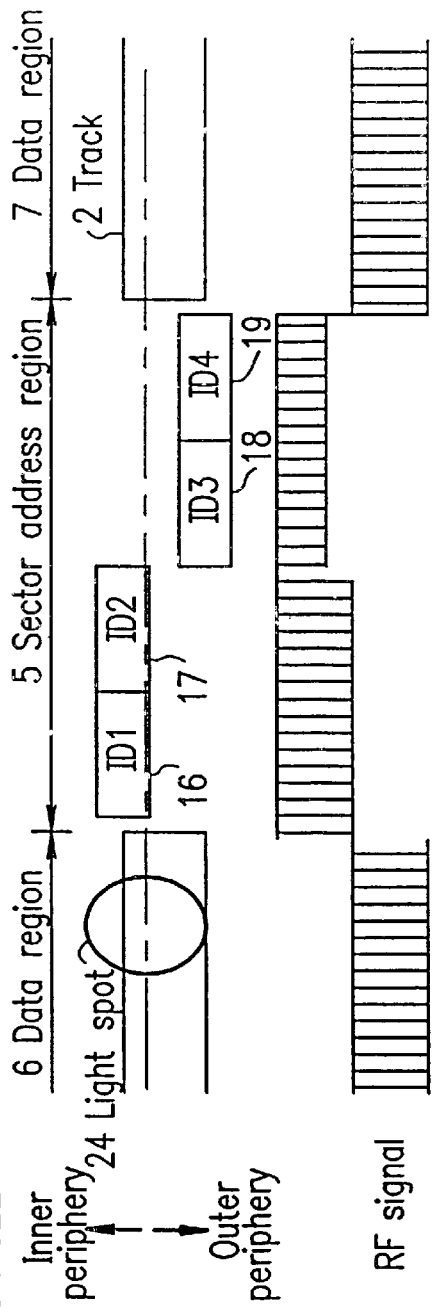
FIG. 4A is a diagram illustrating a tracking offset of a light spot and an RF signal.
Figure 4B:
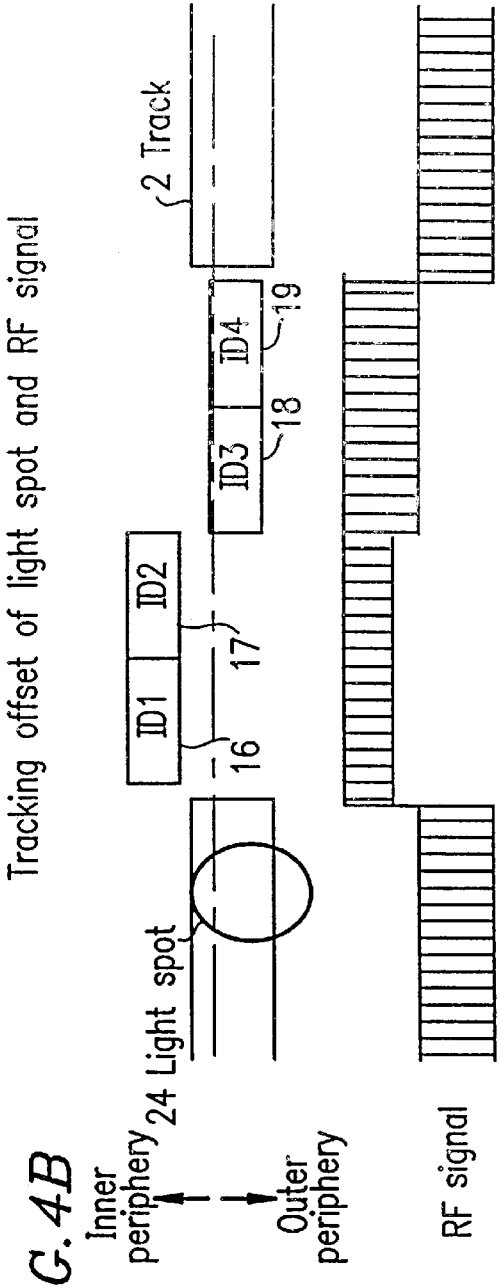
FIG. 4B is a diagram illustrating a tracking offset of a light spot and an RF signal.

FIGS. 4A and 4B show the states of the RF signal in a sector address region when the light spot is in off-track states.

FIG. 4A shows the RF signal in the sector address region 5 in the case where the light spot 24 is shifted toward the inner periphery of the track. FIG. 4B shows the RF signal in the case where the light spot 24 is shifted toward the outer periphery of the track. In FIG. 4A, the RF signal has a large amplification in the address blocks ID1 and ID2 since the light spot 24 passes near the address blocks 16 and 17, and the RF signal has a small amplification in the address blocks ID3 and ID4 since the light spot 24 passes at a distance from the address blocks 18 and 19. Therefore, the address signal becomes difficult to read in ID3 and ID4. However, at least one needs to be properly read in a sector address. In the example shown in FIG. 4A, the RF signal corresponding to ID1 and ID2 is large, thereby making it easy to read the address of ID1 and ID2. Thus, the address of the sector address is read.

Similarly in FIG. 4B, the RF signal amplitude is small in ID1 and ID2, thereby making it difficult to read the address, but the RF signal amplitude is conversely large in ID3 and ID4, thereby making it easy to read the address. In other words, the address readability in the sector addresses does not decrease irrespective of whether the light spot becomes off-track toward the inner periphery side or the outer periphery side from the track center.

By disposing ID1 and ID2 in an alternating manner with respect to ID3 and ID4, the address readability is not decreased for either the land tracks or the groove tracks.

Furthermore, as in FIG. 3B, the level of the TE signal alternately shifts, i.e., to be positive or negative, for every address group. However, by wobbling the address groups, the frequency of level shifts increases. Specifically, in view of the time period (100 $\mu$sec or less) usually required for passing through a sector address region, the frequency of level shifts of the TE signal is 10 kHz or more, which is considerably higher than the control band in which the light spot can follow the target track. Therefore, it is difficult to ensure that the light spot responds to such level shifts of the TE signal. However, since the address groups are disposed so that each address group is wobbled by the same amount toward the inner periphery or the outer periphery, the mean value of level shifts becomes substantially zero, so that offsets of the light spot due to a DC component are unlikely to occur. As a result, tracking offset immediately after passing through the sector address region is minimized, and the disturbance in the tracking control in a subsequent data region can be reduced.

Although the present example described a case where 4 address blocks are provided for 1 sector address, there is no limitation as to these numbers. In the case where an even number of address blocks are disposed equally on the inner periphery side and the outer periphery side, there is provided an effect of preventing disturbance in the tracking control after passing through an address. In the case where an odd number of address blocks are provided, DC components due to the level shifts in the TE signal are generated, but it has little influence because the frequency of level shifts in the TE signal is higher than the tracking control band. It is desirable to provide an even number of address blocks equally on the inner periphery side and the outer periphery side in terms of both address readability and tracking control stability.

Although four address blocks can be redundantly provided in the present example, it is not necessary for all the address numbers to be the same as long as there is a correspondence between the sector address and the address numbers to be recorded in the respective address blocks.

EXAMPLE 2

Hereinafter, Example 2 of the present invention will be described with reference to FIGS. 5A and 5B. Example 2 relates to an optical disk in which additional information other than address information is added to a sector address region 5.

FIGS. 5A and 5B show the arrangement of information blocks in sector address regions. In FIGS. 5A and 5B, referential numerals 107, 108, and 109 denote additional information blocks, where information which is not address number information is recorded. Address blocks 16, 17, 18, and 19 each contain address information for identifying an address number from an ID number. The address blocks 16, 17, 18, and 19 are similar to those described in Example 1 as illustrated in FIG. 2.

The additional information blocks for recording additional information are disposed so as to be shifted by a width of about Tp/2 along the radius direction, as in the case of the address blocks 16, 17, 18, and 19 in Example 1.

In particular, in the case where the additional information is short relative to the address blocks, or where it is impossible to divide the additional information, the additional information block 107 is disposed either on the inner periphery side (shown within a dotted line) or the outer periphery side (shown within a solid line), as shown in FIG. 5A.

In the case where the additional information block is relatively long, the additional information can be divided into identifiable block units 108 and 109 disposed in an alternating arrangement between being shifted toward the inner periphery side and toward the outer periphery side of the track, as shown in FIG. 5B. By adopting the above-mentioned configuration, it is possible to improve the readability of address information and additional information against off-tracking, and the stability of tracking control during and after passing through a sector address region, as in Example 1.

Although the additional information blocks are disposed at the rearmost end of each sector address region according to the present example, the additional information blocks can also be disposed in another position without undermining the effects attained according to the present example. Although the additional information block 108 on the inner periphery side is read next to the address block 19 in FIG. 5B, Example 2 can be modified so that the additional information block on the outer periphery side is read next to the address block 19, after which the additional information block on the inner periphery side can be read.

EXAMPLE 3

Hereinafter, Example 3 of the present invention will be described with reference to FIGS. 6 to 9.

Figure 6A:
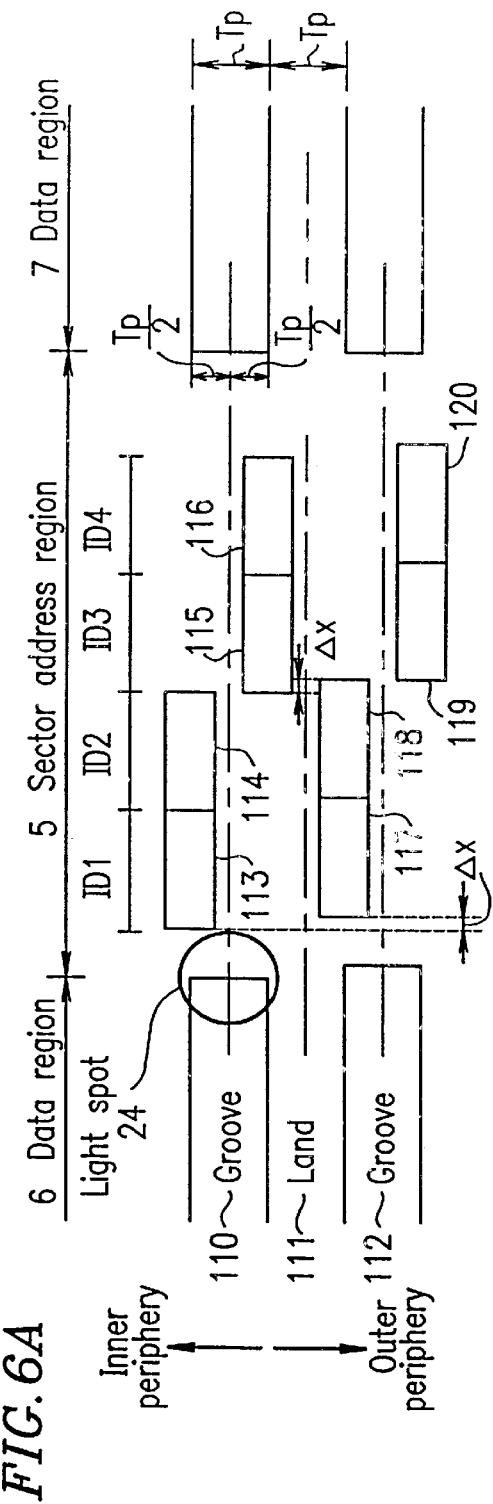
FIG. 6A is a diagram showing the arrangement of address blocks according to Example 3.
Figure 6B:
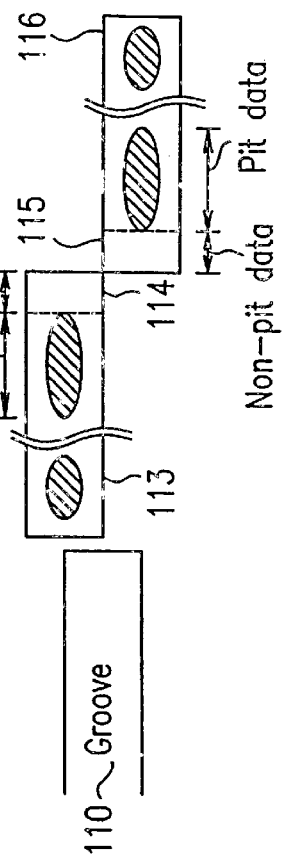
FIG. 6B is a diagram showing the arrangement of address blocks according to Example 3.

FIGS. 6A and 6B show the arrangement of address blocks in sector address regions. In FIGS. 6A and 6B, reference numerals 110 and 112 denote groove tracks; reference numeral 111 denotes a land track; reference numerals 113, 114, 115, 116, 117, 118, 119, and 120 denote address blocks; and reference numeral 24 denotes a light spot. In FIG. 6A, the groove track (groove) 110 and the address blocks 113, 114, 115 and 116 disposed on both sides thereof are formed. Then, after one turn of a master disk, the groove track 112 and the address blocks 117, 118, 119 and 120 disposed on both sides thereof are formed.

In Example 3, as shown in FIG. 6B, data is arranged on the disk in such a manner that the last pattern in each address block is not pits and that the beginning pattern in the next address block is also not pits.

In particular, non-pit data which is longer than the rotation accuracy ($\Delta X$) during the cutting of the master disk is provided as the non-pit data in the last pattern and the beginning pattern of an address block.

Below is the reason why data is arranged on the disk in such a manner that the last pattern in each address block is not pits and that the beginning pattern in the next address block is also not pits.

First, a method for forming tracks and address pits will be briefly described. In general, tracks and pits are formed by radiating cutting laser light onto a rotating master disk. A continuous groove is obtained when the laser light is continuously radiated, which becomes a track (i.e., groove in the present example). By discontinuously radiating laser light by turning it on and off in accordance with a recording signal representing an address, pits are formed in the portions irradiated by the laser light and address signals can be recorded. In other words, in the case of a disk having sector addresses, tracks and addresses are formed in each complete round of the disk by controlling the radiation of the cutting laser light in the groove portions and the address pit portions while moving the cutting laser light along the radius direction by a track pitch for every turn of the master disk.

The wobbled addresses according to Examples 1 and 2 are also formed by a method similar to the above-described method for forming tracks and address pits. Specifically, groove tracks (grooves) are formed by the laser light, and the address pits are disposed in a split manner, i.e., so as to be either on the inner periphery side or the outer periphery side of the track. Therefore, in a sector address region, the cutting laser light is turned on or off while shifting the center of the cutting laser light for each address block by Tp/2 either toward the center of the optical disk or in the opposite direction of the center of the optical disk.

Figure 7A:
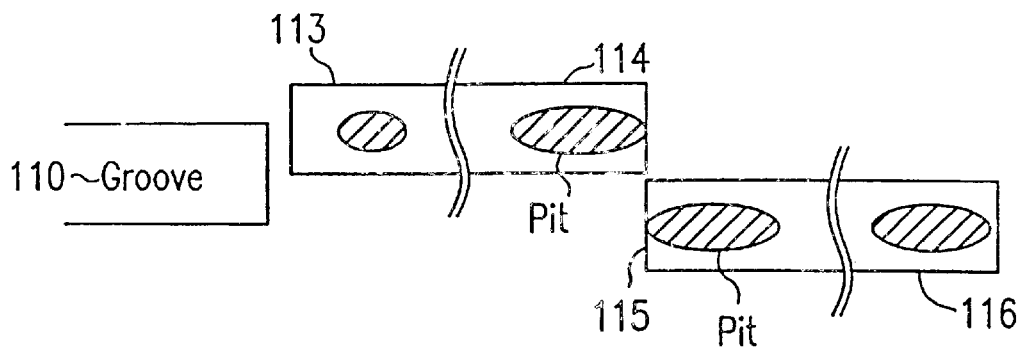
FIG. 7A is a schematic diagram illustrating continuous pits in address groups.
Figure 7B:
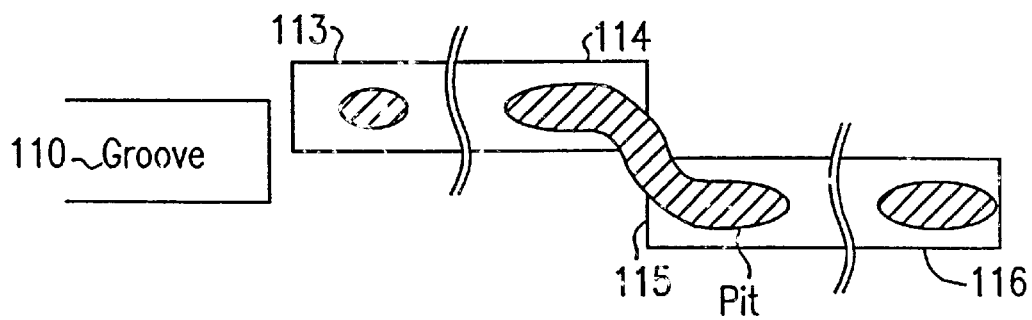
FIG. 7B is a schematic diagram illustrating continuous pits in address groups.

FIGS. 7A and 7B are schematic diagrams showing a portion where two address groups are connected to each other. Specifically, the figures illustrate the case where address blocks share a continuous pit array.

FIG. 7A shows an expected pit configuration. The last pit of the address block 114 and the first pit of the address block 115 are formed at a predetermined distance away from the center of each address block. Since the address pits are formed while displacing the laser light at the address sections during the cutting of the master disk, in the case where pits are to be formed in a portion connecting the address block 114 and the address block 115, the laser light also irradiates the disk while displacing the cutting laser along the radius direction. As a result, incorrect pits are formed as shown in FIG. 7B, so that it is impossible to reproduce proper data.

Since the rotation accuracy and the like of the master disk have some fluctuation, the positions of address blocks of the same ID number (e.g., address blocks 113 and 117 shown in FIG. 6A) do not necessary coincide in position along the circumference direction. If their positions are offset by a distance of $\Delta X$ as shown in FIG. 6A, there is a possibility that the reproduced (RF) signal may not be accurately detected when reproducing the land track 111 because the end of the address block 118 and the beginning of the address block 115 overlap with each other by the distance $\Delta X$.

Figure 8A:
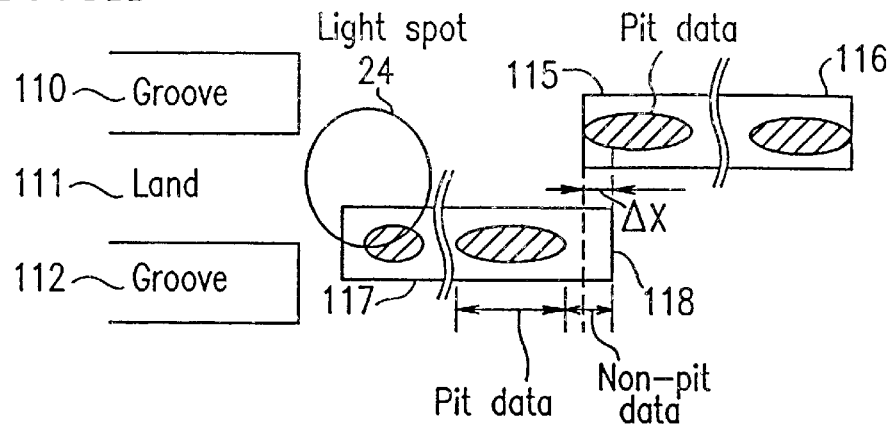
FIG. 8A is a diagram illustrating a reading operation for pits in the case where a light spot is reproducing a land track.
Figure 8B:
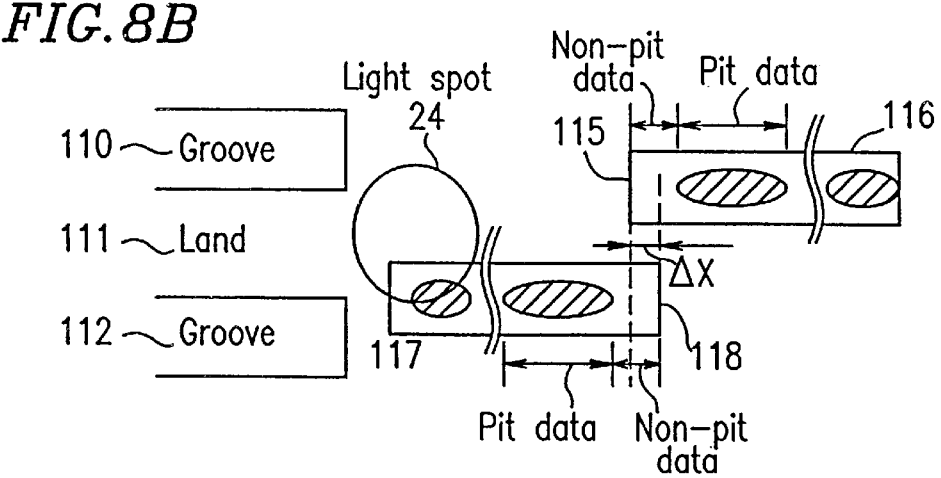
FIG. 8B is a diagram illustrating a reading operation for pits in the case where a light spot is reproducing a land track.

FIGS. 8A and 8B are diagrams illustrating a reading operation for pits in the case where a light spot 24 is reproducing a land track 111. FIG. 8A shows the address block 118 and the address block 115 in the case where the pit array in a connecting portion between address blocks is not defined. Specifically, FIG. 8A shows the case where the address block 118 and the address block 115 overlap with each other in physical terms and in term of timing at a cutting accuracy of ΔX, with the beginning of the address block 115 being pit data.

In this case, if the non-pit data at the end of the address block 118 overlaps with the pit data in the beginning of 115, the reproduced signal which has been read from the disk will be determined as indicating the presence of pits, so that the data recorded in the address block 118 will not be properly reproduced.

FIG. 8B is a schematic diagram illustrating the case where the beginning and the end of the address block is non-pit data. When reproducing the address block 118 in FIG. 8B, if the non-pit data in the last data of the address block 118 overlaps with the non-pit data in the beginning of the address block 115, the reproduced signal will be non-pit data, so that the data recorded in the address block 118 will be properly reproduced. On the other hand, when reproducing the data recorded in the address block 115, the number of non-pit data in the beginning of the address block 115 cannot be properly read. However, in general, the beginning of an address block is a VFO region, and it is not always necessary to reproduce all the data recorded in the VFO region because the problems inherent in the reading operation for address blocks can be avoided as long as synchronization can be reestablished in the AM region following the VFO region for reading the data recorded in the address data section so that the address number and the error detection code (EDC) can be properly recognized.

FIGS. 9A to 9D show exemplary data waveforms.

FIGS. 9A and 9B each show a VFO (clock synchronization signal) pattern in the beginning of an address block. The code after recording modification is represented as NRZ (non return zero). The level of the recording signal is inverted at code "1". The patterns in FIGS. 9A and 9B show patterns which are inverted every 4T, where T represents the period of the recording codes. It is ensured that the beginning of this repetition patten always begins with a space.

FIGS. 9C and 9D each show a postamble (PA) pattern in the end of an address block. In the postamble, the pattern in the earlier portion of the postamble varies depending on whether it follows a mark or a space because the last data of the error detection code must conform to the rules of modification code during recording. It is ensured that the rest of the postamble to follow is always a space.

Thus, by ensuring that the beginning pattern and the last patten of each sector address block are spaces as shown in FIGS. 9A to 9D, it becomes possible to prevent, with respect to address blocks that are disposed in a wobble manner, reading errors in address data due to incorrect formation of pits during the cutting of the master disk and overlapping between address blocks during the reproduction of a sector address. In the present example, errors do not occur even in the case where address blocks overlap with each other up to a length of 4T.

The method for forming grooves and address pits is not limited to that described above. As an alternative method, for example, a shift of only Tp/2 can be effected per rotation of the master disk so as to form the address group on the inner periphery side, grooves, and the address group on the outer periphery side in this order. In this case, malformation due to connections of pits does not occur because wobbling addresses are cut in different rounds; however, overlapping of address blocks may occur due to rotation accuracy errors. Accordingly, the structure of the present example, where data is arranged on the disk in such a manner that the last pattern in each address block is not pits and that the beginning pattern in the next address block is also not pits, is effective. In this cutting method, one groove is formed per three rotations.

Alternatively, it is possible to cut the track grooves, the address pits on the inner periphery side, and the address pits on the outer periphery side with different lasers by employing a set of three laser beams, i.e., a laser beam for forming the track grooves, a laser beam for forming the address pits on the inner periphery side, and a laser beam for forming the address pits on the outer periphery side, where the respective laser beams are turned on or off at predetermined positions. In this case, malformation due to connections of pits does not occur because wobbling addresses are cut in different rounds; however, overlapping of address blocks may occur due to laser positioning accuracy errors. Accordingly, the structure of the present example, where data is arranged on the disk in such a manner that the last pattern in each address block is not pits and that the beginning pattern in the next address block is also not pits, is effective. This cutting method employs a complicated cutting apparatus.

EXAMPLE 4

Hereinafter, Example 4 of the present invention will be described with reference to FIG. 10.

Figure 10:
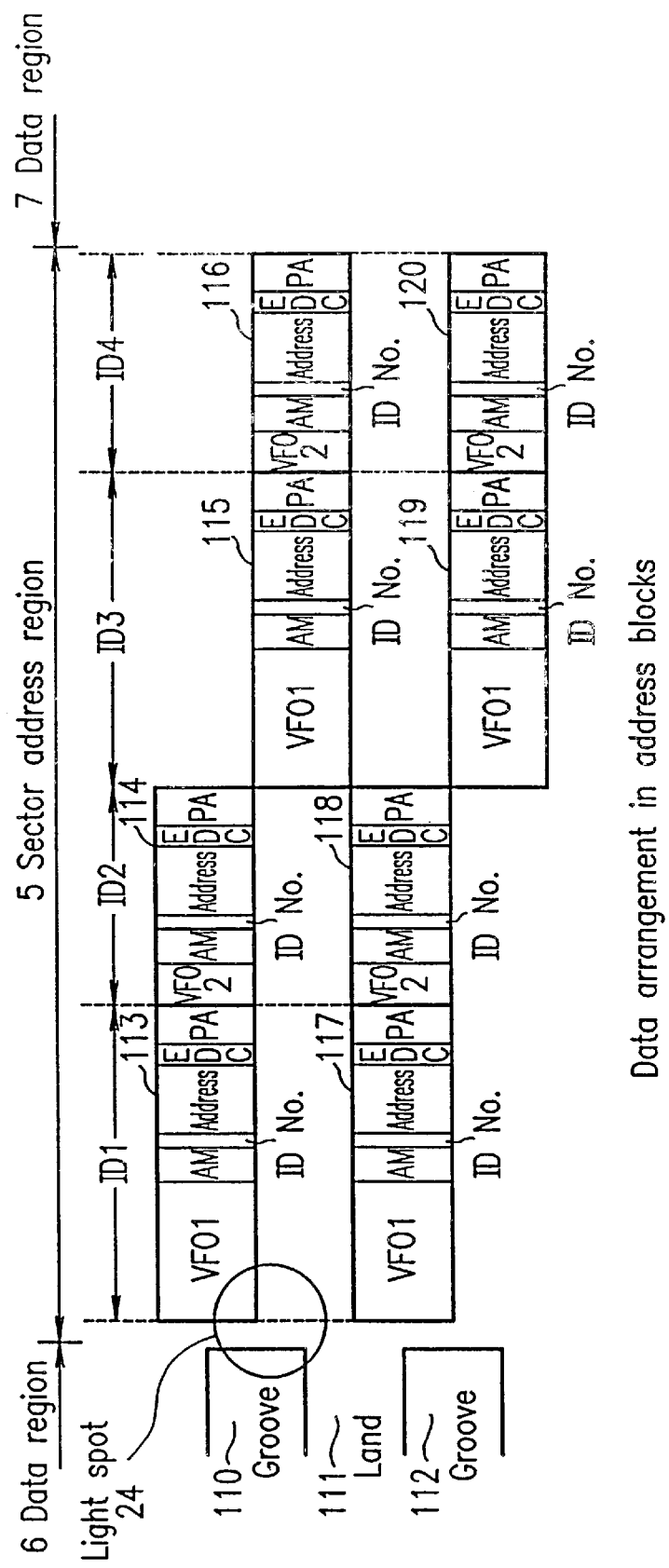
FIG. 10 is diagram illustrating data arrangement within an address block.

FIG. 10 shows the arrangement of data in sector address blocks. As in Example 1, reference numerals 110 and 112 denote groove tracks; reference numeral 111 denotes a land track; reference numerals 113, 114, 115, 116, 117, 118, 119, and 120 denote address blocks; and reference numeral 24 denotes a light spot. The address block 113 in ID1 includes the following data: VFO1, address mark (AM), ID number, address number, EDC, and postamble (PA). The address block 114 in ID2 includes the following data: VFO2, address mark (AM), ID number, address number, EDC, and postamble (PA). ID3 and ID4 following ID1 and ID2 also include similar data. The order in which the respective data are arranged within each address block is the same as in Example 1.

The difference from Example 1 is that the length of VFO1 of the address block in ID1 and ID3 is larger than that of VFO2 of the address block in ID2 and ID4.

When a sector address region is reproduced with a light spot 24, the data recorded in the address blocks in ID1 and ID2 are reproduced in this order.

A data region 6 is composed of a track, but a sector address region 5 is composed of a mirror face having address pits formed therein, the mirror face being shifted from the track center by Tp/2. Therefore, as shown in FIG. 4, the d.c. signal component (DC level) of the RF signal as a reproduced signal in the data region 6 differs from the d.c. signal component (DC level) of the RF signal in the sector address region 5. Thus, the level of the RF signal drastically changes immediately after the light spot 24 has moved from the data region 6 to the sector address region 5. Therefore, it takes more time to lock the PLL in order to match the phases of the data (VFO1) and the data reading clock used when the recording/reproduction apparatus reads the data recorded in ID1 than in the case where there is no level variation. However, when the light spot 24 travels from ID1 to ID2, the level of the RF signal does not change, so that the time for locking the PLL in order to match the phases of the data (VFO2) and the data reading clock used when the recording/reproduction apparatus reads the data recorded in ID2 becomes shorter than in the case where there is some level variation. As a result, the length of VFO2 can be made shorter than the length of VFO1.

When reproducing the sector address region of a land track, the phases of the reproduction clocks for the former address group (ID1, ID2) do not necessarily coincide with those for the latter address group (ID3 and ID4). This is because the former address group is recorded concurrently with the groove adjoining the land track on the outer periphery side, whereas the latter address group is recorded concurrently with the groove adjoining the land track on the inner periphery side, so that rotation variation and/or frequency variation may occur between forming the groove on the outer periphery side and forming the groove on the inner periphery side. Therefore, the recording/reproduction apparatus relocks the PLL at the VFO 1 of the first address block (ID3) of the latter address group. A longer length of VFO1 provides more stable locking.

In the case where the data lengths of all the address blocks are made equal, the lengths of the VFO2s in ID2 to ID4 can be made equal to the length of VFO1 required for the recording/reproduction apparatus to properly reproduce the data recorded in ID1 and ID3. However, this method makes VFO2 in ID2 to ID4 unnecessarily long, and a lengthy VFO2 leads to waste.

Therefore, the length of VFO2 in ID2 and ID4 can be made shorter than the length of VFO1 in ID1 and ID3, as long as a VFO length required for each address block is secured. As a result, it becomes possible to reduce redundant data while maintaining readability of addresses.

By prescribing the length of VFO1 in ID1 and the length of VFO1 in ID3 to be equal and prescribing the length of VFO2 in ID2 and the length of VFO2 in ID4 to be equal, the date lengths in the address groups all become equal, and there is substantially no influence on the average value of the tracking error signal in the sector address region as described in Example 1.

EXAMPLE 5

Hereinafter, Example 5 of the present invention will be described with reference to FIG. 11.

Figure 11:
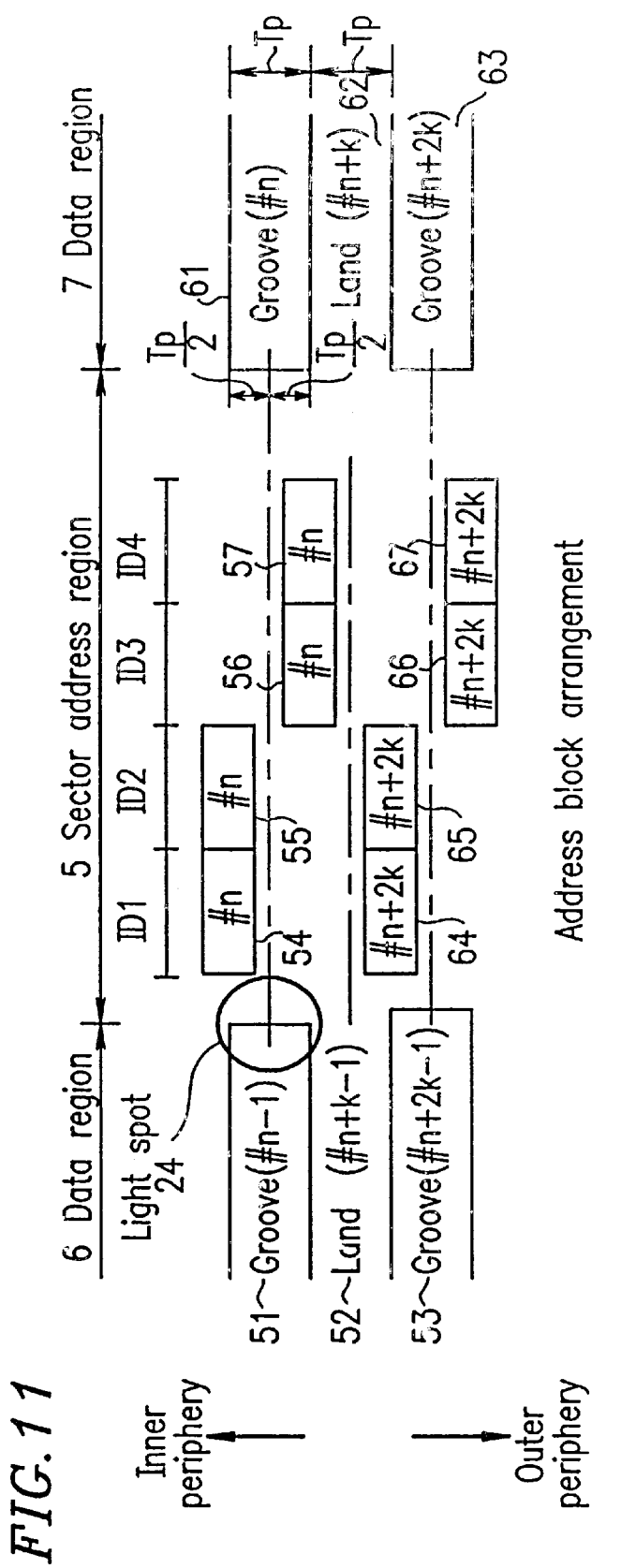
FIG. 11 is a diagram showing an exemplary case where address numbers are added to sector addresses.

FIG. 11 shows an example where address numbers are assigned to the sector addresses of the disk described in Example 1. Reference numeral 5 denotes a sector address region; reference numerals 6 and 7 denote data regions; reference numerals 51, 53, 61, and 63 denote groove tracks; reference numerals 52 and 62 denote land tracks; and reference numerals 54, 55, 56, 57, 64, 65, 66, and 67 denote address blocks.

A method for setting the addresses used in the present example will be described. It is assumed that an address to be recorded in a sector address region 5 represents the sector of a subsequent data region 7. It is also assumed that groove tracks and land tracks alternate track by track, with sector addresses sequentially assigned thereto. Only the address values of a sector of a groove are set in a set of address blocks (ID1 to ID4), so that the same value is repetitively recorded. Assuming that the sector address of the groove track 61 is #n, the sector address of the groove track 51 is #(n−1). As the address value for the address blocks 54, 55, 56, and 57, #n is recorded in each address region (address 13 in FIG. 2). It is assumed that the land track 52 is #(n+k−1); the land track 62 is #(n+k); the groove track 53 is #(n+2k−1); and the groove track 63 is #(n+2k), where the track number is counted up by k for every turn of a track. As an address value for the address blocks 64, 65, 66, and 67, #(n+2k) is recorded.

EXAMPLE 6

Figure 12:
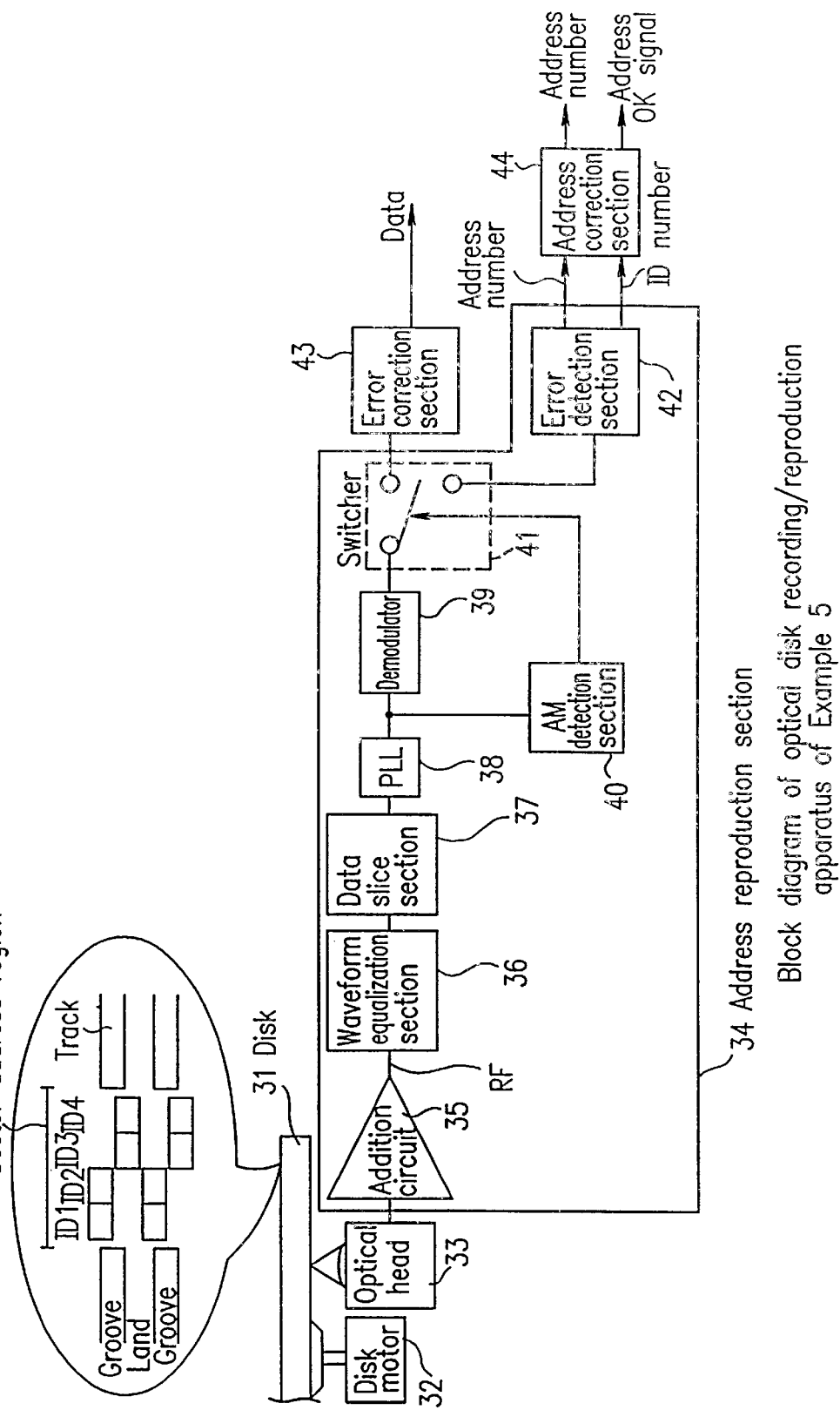
FIG. 12 is a block diagram showing an exemplary optical disk recording/reproduction apparatus.

FIG. 12 is a block diagram showing an optical disk recording/reproduction apparatus according to Example 6 for reading out the sector address of the optical disk described in Example 1. In FIG. 12, reference numeral 31 denotes a disk; reference numeral 32 denotes a disk motor; reference numeral 33 denotes an optical head; and reference numeral 34 denotes an address reproduction section. The address reproduction section 34 includes an addition circuit 35, a waveform equalization section 36, a data slice section 37, a PLL 38, a demodulator 39, an AM detection section 40, a switcher 41, and an error detection section 42. Reference numeral 43 denotes an error correction section; and reference numeral 44 denotes an address correction section.

Although a process for controlling the position of the light spot along the focus direction is performed, the present invention assumes that a general focusing control is implemented, and therefore the description of focusing control is omitted.

Hereinafter, an operation of the optical disk recording/reproduction apparatus of FIG. 12 for reading the data recorded in a sector address region including address blocks arranged as shown in FIG. 11 will be described.

An optical head 33 radiates laser light onto the disk 31, whereby two reproduced signals are detected from the amount of reflected light from the disk 31. The two reproduced signals are added by the addition circuit 35 to give an RF signal, and the RF signal is led through the waveform equalization section 36, the data slice section 37, the PLL 38, the demodulator 39, the switcher 41, and the error detection section 42, and an address number and an ID number are extracted for each address block. The operation of extracting the address number and the ID number is the same as that illustrated in the description of conventional examples.

When the light spot 24 reproduces the groove tracks 51 to 61, the address signals obtained in the sector address region are, respectively, (#n, 1), (#n, 2), (#n, 3), and (#n, 4), which are pairs of (address number, ID number). These values are input to the address correction section 44 (see FIG. 13).

On the other hand, when the light spot 24 reproduces the groove tracks 52 to 62, the address signals obtained in the sector address region are, respectively, (#n+2k, 1), (#n+2k, 2), (#n, 3), and (#n, 4), which are input to the address correction section 44 in this order.

In the address correction section 44, the address value of the sector is determined based on the pair of the reproduced address number and ID number. The determination utilizes the rules of a format in which an address value is assigned to each address block. In the present example, the format shown in FIG. 11 is employed. According to such a definition, all of the four reproduced addresses take the same value when a groove sector has been reproduced, whereas the address values within an address group become the same when a land sector has been reproduced. The difference in address value between address groups is 2k, which is the number of sectors corresponding to two rounds of the track.

Figure 13:
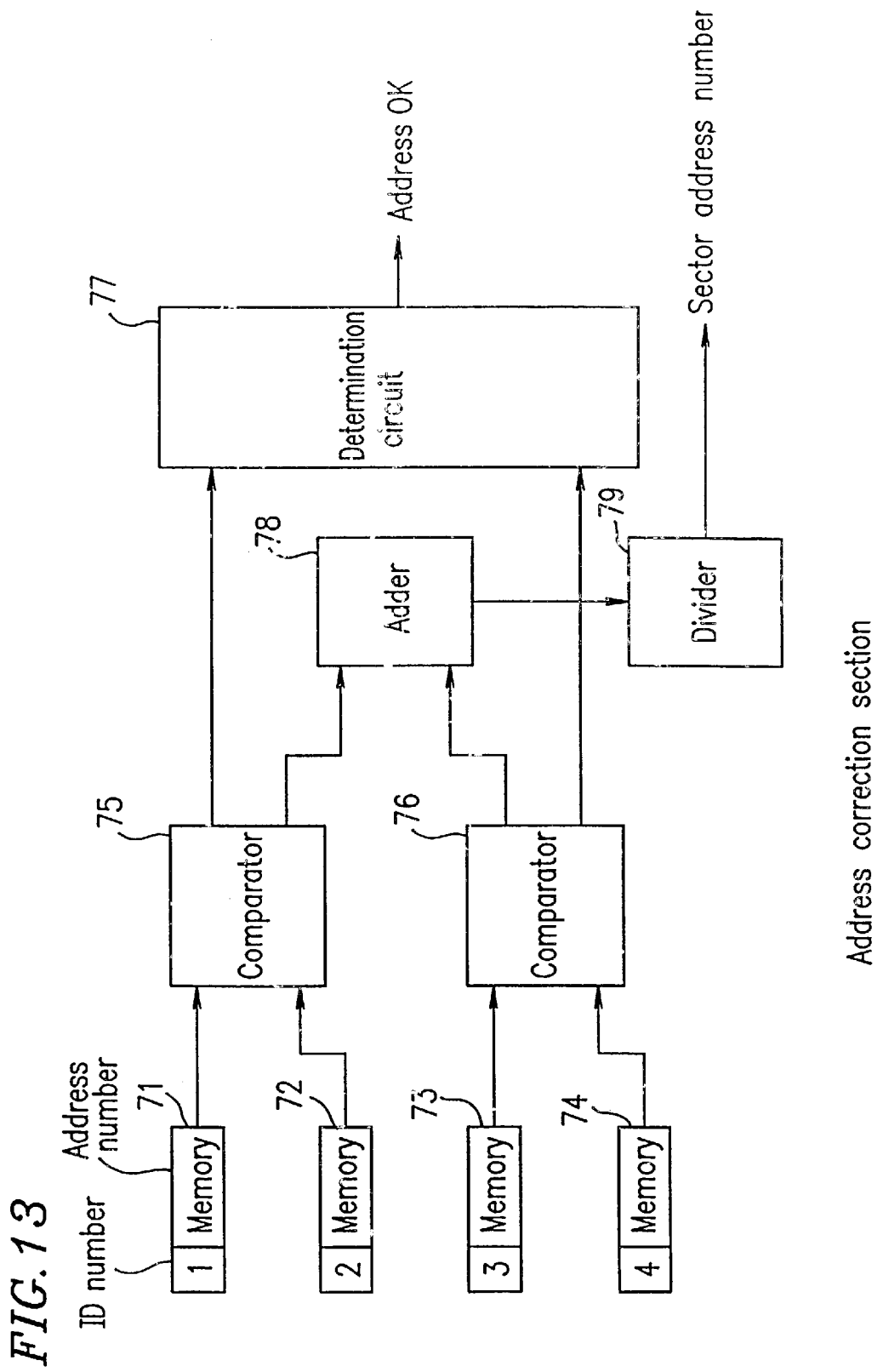
FIG. 13 is a block diagram showing an address correction section.

FIG. 13 shows the structure of an address correction section according to one example. In FIG. 13, reference numerals 71, 72, 73, and 74 denote memories; reference numerals 75 and 76 denote comparators; reference numeral 77 denotes a determination circuit; reference numerals 78 denotes an adder; reference numeral 79 denotes a divider. The address number and ID number which have been determined to include no errors in the error detection section 42 shown in FIG. 12 are sent to the address correction section 44. In the address correction section in FIG. 13, the address numbers reproduced in the respective IDs are stored in the memories 71, 72, 73, and 74 corresponding to the respective ID numbers. The comparator 75 compares the address numbers from ID1 and ID2 stored in the memories 71 and 72. If they coincide, the address number is determined as being properly reproduced, and a "coinciding" signal is output to the determination circuit, and the address number is sent to the adder 78.

Similarly, the comparator 76 compares the address numbers from ID3 and ID4 stored in the memories 73 and 74. If they coincide, the address number is determined as being properly reproduced, and a "coinciding" signal is output to the determination circuit, and the address number is sent to the adder 78. The adder 78 adds the two address numbers, which are sent to the divider 79. The divider 79 divides the input value by 2, and outputs this as a detected address number. The determination circuit 77 determines whether the address number obtained is correct or not based on the "coinciding" signals from the comparators 75 and 76.

A method for reading the data recorded in a sector address region incorporating the address blocks shown in FIG. 11 will be described. When the light spot 24 reproduces the groove tracks 51 to 61, the address numbers obtained in the sector address region are, respectively, (#n, 1), (#n, 2), (#n, 3), and (#n, 4), which are pairs of (address number, ID number). Thus, all the address values coincide, so that the determination circuit 77 recognizes it as the correct address, and the above-described mathematical operation is performed for the address value, whereby #n is obtained as a sector address. When the light spot 24 reproduces the land tracks 52 to 62, the address numbers obtained in the sector address region are, respectively, (#n+2k, 1), (#n+2k, 2), (#n, 3), and (#n, 4). The comparators 75 and 76 each output a "coinciding" signal. The determination circuit 77 determines it as the correct address, and the above-described mathematical operation is performed for the address value, whereby #(n+k) is obtained as a sector address.

According to the present example, it is unnecessary to identify a sector as that of a groove or a land, so that a sector address can be always obtained by the same mathematical operation.

However, the address correction method according to the present example is also applicable to the case where it is necessary to identify the addresses of grooves from the addresses of lands due to, for example, system controls. The address numbers output from the comparators 75 and 76 are also supplied to the determination circuit 77, where they are compared for coincidence. The determination circuit 77 determines that the addresses represent a sector of a groove if they coincide, or that the addresses represent a sector of a land if they do not coincide. A more strict determination can be achieved by the determination circuit 77 comparing the two address numbers and determining them as pertaining to a sector of a land if the difference is 2k.

Although the present example described the case where all the address blocks of ID1 to ID4 are reproduced without errors, the invention is not limited thereto. In the case where an error is detected in the error detection section 42, for example, even if a signal from a comparator indicates "not coinciding", the address of one address block of the same address group which has been reproduced without errors can be adopted as an address number.

Furthermore, although it is ensured that the same address number can be read when reproducing a groove in the present example, it is also applicable to ensure that the same address number can be read when reproducing a land. Although the same address number is repeatedly provided for one set of address blocks (ID1 to ID4) of a groove track, the invention is not limited thereto. Instead of employing the above-described recording format (rules) for the address, if the ID numbers and their recording format (rules) are known, an address number can be generated based on the ID numbers and their recording format (rules).

EXAMPLE 7

Example 7 of the present invention will be described with reference to FIGS. 14, 15A to 15D, and 16A to 16C. Example 7 relates to an apparatus for detecting tracking offset of a light spot.

FIG. 14 is a block diagram showing the optical disk recording/reproduction apparatus according to Example 7. In FIG. 14, reference numeral 31 denotes a disk; reference numeral 32 denotes a disk motor; reference numeral 33 denotes an optical head; reference numeral 34 denotes an address reproduction section; reference numeral 81 denotes a tracking error signal detection section. The tracking error signal detection section 81 includes a differential circuit 82 and a LPF (Low Pass Filter) 83. Reference numeral 84 denotes a phase compensation section; reference numeral 85 denotes a head driving section; reference numeral 90 denotes a timing generation section; reference numeral 91 denotes an outer periphery value sample-hold section; reference numeral 92 denotes an inner periphery value sample-hold section; reference numeral 93 denotes a differential circuit; and reference numeral 94 denotes a gain conversion circuit.

Hereinafter, an operation of the optical disk recording/reproduction apparatus of FIG. 14 for detecting an amount of offset between a light spot and a track (off-tracking amount) in a sector address region having address blocks disposed as shown in FIG. 10 will be described.

An optical head 33 radiates laser light onto the disk 31, whereby two reproduced signals are detected from the amount of reflected light. The two reproduced signals are converted by the address reproduction section 34 into an RF signal, and an address number and an ID number are extracted from the RF signal for each address block; this operation is the same as the operation in the description of conventional examples. The differential circuit 82 derives a difference between the reproduced signals, and the derived difference is led through the LPF 83 so as to be output as a TE signal.

FIG. 15A is a schematic diagram showing the change in the tracking error signal (TE signal) in a sector address region 5 during an off-track state. The level of the TE signal shifts substantially in proportion with the distance between the light spot and the address block, and the direction of level shifts is determined by the distance between the light spot and the address block, as described in Example 1. Herein, it is assumed that the TE signal takes a negative value when the light spot 24 passes on the outer periphery side of the address block and takes a positive value when the light spot 24 passes on the inner periphery side of the address block. When the light spot 24 follows (a) of a track 2, the level shift VTE1 of the TE signal takes a small negative value because the distance between the light spot 24 and the address block is small in ID1 and ID2. The level shift VTE3 of the TE signal takes a large positive value because the distance between the light spot 24 and the address pits block is large in ID3 and ID4. As a result, a TE signal shown in FIG. 15B is obtained.

When the light spot 24 follows line (b) of the track 2, the level shift amount is the same because the distances between the light spot 24 and the address blocks ID1 to ID4 are the same. The level shift VTE1 takes a negative value in ID1 and ID2, and the level shift VTE3 takes a positive value in ID3 and ID4. As a result, a TE signal shown in FIG. 15C is obtained.

When the light spot 24 follows line (c) of the track 2, the level shift VTE1 of the TE signal takes a large negative value because the distance between the light spot 24 and the address block is large in ID1 and ID2. When the light spot 24 follows line (c) of the track 2, the level shift VTE3 of the TE signal takes a small positive value because the distance between the light spot 24 and the address block is large in ID3 and ID4. As a result, a TE signal shown in FIG. 15D is obtained.

As shown in FIGS. 15A to 15D, the levels of VTE1 and VTE3 vary depending on which position of the track 2 the light spot 24 has moved over, so that the off-tracking amount can be deduced based on a difference between these level shifts, that is, by deriving Voftr=VTE1−VTE3. If the light spot 24 follows the center line (b) of the track 2, VTE1−VTE3=0 in the sector address region 5; if the light spot 24 follows the line (a) of the track 2, VTE1−VTE3<0 in the sector address region 5; and if the light spot 24 follows the line (c) of the track 2, VTE1−VTE3>0 in the sector address region 5. Thus, the direction and amount of off-tracking can be obtained.

Hereinafter, the operation of the timing generation section 90 for generating a timing signal for sampling the TE signal will be described. FIG. 16A is a diagram showing a portion of the data region and a sector address region. FIGS. 16B and 16C are timing diagrams of gate signal generation in the timing generation section 90. Address read-out signals are input from the address reproduction section 34 to the timing generation section 90. A gate signal GT1 which is in synchronization with address blocks on the inner periphery side and a gate signal GT2 which is in synchronization with address blocks on the outer periphery side are generated based on the address read-out signals. The gate signal GT1 is a signal for sampling the TE signal in the inner periphery value sample-hold section. The gate signal GT2 is a signal for sampling the TE signal in the outer periphery value sample-hold section.

FIG. 16B shows exemplary gate signals GT0, GT1, and GT2 where the recording/reproduction apparatus of Example 7 has successfully read ID1. The timing with which ID2, ID3, and ID4 appear can be known if ID1 is successfully read. For example, the recording/reproduction apparatus of Example 7 can generate the signal GT0, which is in synchronization with the end of ID1. In the case where the signal GT0 in synchronization with the end of ID1 is generated, the gate signal GT1 is generated at a point lagging by time T1 behind the time at which the gate signal GT0 was generated, and the gate signal GT2 is generated at a point lagging by time T2 behind the time at which the gate signal GT0 was generated. Thus, the gate signal GT1 for sampling and holding the TE signal in the address block ID2 on the inner periphery side and the signal GT2 for sampling and holding the TE signal in the address block ID3 (or ID4; this example conveniently illustrates ID3) on the outer periphery side can be generated.

FIG. 16C shows an exemplary gate signal GT0 which is in synchronization with and represents a sector address region and also shows gate signals GT1 and GT2 which are in synchronization with the gate signal GT0.

It is assumed that the gate signal GT0 representing a sector address region rises immediately before a sector address region. The gate signal GT1 is generated at a point lagging by time T3 behind the time at which the gate signal GT0 was generated. The gate signal GT2 is generated at a point lagging by time T4 behind the time at which the gate signal GT0 was generated. Thus, the gate signal GT1 for sampling and holding the TE signal in the address block ID2 on the inner periphery side and the signal GT2 for sampling and holding the TE signal in the address block ID3 (or ID4; this example conveniently illustrates ID3) on the outer periphery side can be generated.

By using the gate signals GT1 and GT2 generated by the timing generation section 90, with reference to FIG. 16B, for example, the level VTE3 of the TE signal in the address block ID3 on the outer periphery side is stored in the outer periphery value sample-hold section 91 in synchronization with the gate signal GT2, and the level VTE1 of the TE signal in the address block ID2 on the inner periphery side is stored in the inner periphery value sample-hold section 92 in synchronization with the gate signal GT1. As a result, a value (VTE1−VTE3) is output from the differential circuit 93. Since this value corresponds to the off-tracking amount, it can be further converted into an off-track signal (OFTR signal) by adjusting its level to the level of the TE signal in the gain conversion section 94. In the tracking control system, a state may occur in which the light spot is not actually in the track center while the TE signal is controlled to be zero, owing to offset components and the like generated in the tracking error signal detection section 81, the phase compensation section 84, and the head driving section 85. Accordingly, by arranging the recording/reproduction apparatus having the structure shown in FIG. 14 so that it generates the OFTR signal for correcting the offset in the tracking control system, it becomes possible to position the light spot in the track center. It is also possible to position the light spot in the track center by using the gate signals GT0, GT1, and GT2 shown in FIG. 16C.

The gate signal GT1 is to be generated in synchronization with an address block on the inner periphery side, and the gate signal GT2 is to be generated in synchronization with one of the address blocks on the outer periphery side. The gate signals GT1 and GT2 are not limited to specific address blocks.

Although time T1 and time T2 do not need to be exactly timed, it is preferable that the pit arrangement patterns in the respective address blocks are measured with the same period. For example, in the address block format shown in FIG. 10, the clock synchronization signal (VFO1) of the address blocks ID1 and ID3 are prescribed to be very long relative to the other regions, so that this region is suitably used for sampling because the reproduced signal becomes stable in this region (in particular the latter portion).

Although one address block on the inner periphery side and one address block on the outer periphery side are sampled and held in the present example, a more averaged value can be detected by detecting an off-track signal using a mean value of a plurality of address blocks on the inner periphery side and a mean value of a plurality of address blocks on the outer periphery side, even if the tracks are locally warped.

EXAMPLE 8

Example 8 of the present invention will be described with reference to FIG. 17.

FIG. 17 is a block diagram showing the optical disk recording/reproduction apparatus according to Example 8. In FIG. 17, reference numeral 31 denotes a disk; reference numeral 32 denotes a disk motor; reference numeral 33 denotes an optical head; reference numeral 34 denotes an address reproduction section; reference numeral 81 denotes a tracking error signal detection section; reference numeral 84 denotes a phase compensation section; and reference numeral 85 denotes a head driving section. Reference numeral 90 denotes a timing generation section; reference numeral 91 denotes an outer periphery value sample-hold section; reference numeral 92 denotes an inner periphery value sample-hold section; reference numeral 93 denotes a differential circuit; and reference numeral 94 denotes a gain conversion circuit. Reference numeral 100 denotes a reflected light amount signal detection section. The reflected light amount signal detection section 100 includes an addition circuit 101 and a LPF (low pass filter) 102.

In FIG. 17, reference numerals 31, 32, 33, 34, 81, 84, 85, 90, 91, 92, and 93 denote the same constitution as that of Example 7, and the descriptions of their operations are omitted. While a TE signal is sampled and held in order to detect an off-tracking amount in Example 7, the detection of the off-tracking amount in Example 8 is performed by sampling and holding a reflected light amount signal (AS signal) detected by the reflected light amount signal detection section 100.

In the reflected light amount signal detection section 100, the outputs of a two-divided photosensitive elements of the optical head 33 are summed up in the addition circuit 101, and the added signal is led through the LPF 102 (having a band on the order of a few dozen kHz, which is higher than the tracking control band but lower than the RF signal) in order to remove the high-frequency component thereof. As a result, an AS signal is detected as a signal indicating an average reflected light amount.

As described in Example 1, the RF signal shifts as shown in FIG. 3B, 4A or 4B depending on where the light spot 24 passes. FIG. 4A shows an RF signal in the case where the light spot 24 passes along positions shifted toward the inner periphery side, and FIG. 4B shows an RF signal in the case where the light spot 24 passes along positions shifted toward the outer periphery side.

Since the AS signal indicates an average level of the RF signal, the AS signal varies so as to follow the change in amplitude of the RF signal. Therefore, by sampling and holding the AS signal in synchronization with the address blocks on the inner periphery side and the address blocks on the outer periphery side and obtaining a difference therebetween as in Example 7, a signal corresponding to the off-tracking amount can be detected. Gate signals GT1 and GT2 for the sampling and holding are generated by the timing generation section 90 in Example 7. However, as for the timing of gate pulse signal generation, it is preferable to employ an AS signal derived from the VFO portion, the AM portion, or a specially provided pit portion because a more accurate detection will be enabled by sampling AS signals at portions in address blocks having the same pit pattern.

Moreover, the optical disk recording/reproduction apparatus of Example 8 can employ an offtrack signal (OFTR signal) detected by using the AS signal for correcting the offset in the tracking control system, as in Example 7.

EXAMPLE 9

Hereinafter, an optical disk recording/reproduction apparatus according to Example 9 of the present invention will be described with reference to FIGS. 18, 19A to 19H, 20A to 20H, and 21. The optical disk recording/reproduction apparatus of Example 9 includes an ID detection circuit for an optical disk.

Figure 19A:
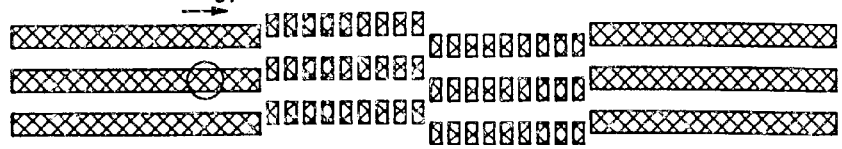
FIG. 19A is a diagram showing an ID section which is disposed in a symmetrical manner in a middle position between a land and a groove.

As shown in FIG. 19A, an optical disk to be used in Example 9 has a structure in which ID sections are provided in a symmetrical manner in a middle position between a land and a groove. Alternatively, the ID section may have a structure shown in FIG. 3A. Example 9 provides a function of detecting the positions and polarities of the ID sections based on a reproduced signal from an optical disk and outputting a read gate and a land groove identification signal, which serve as references for reading signals in the optical disk apparatus.

Figure 18:
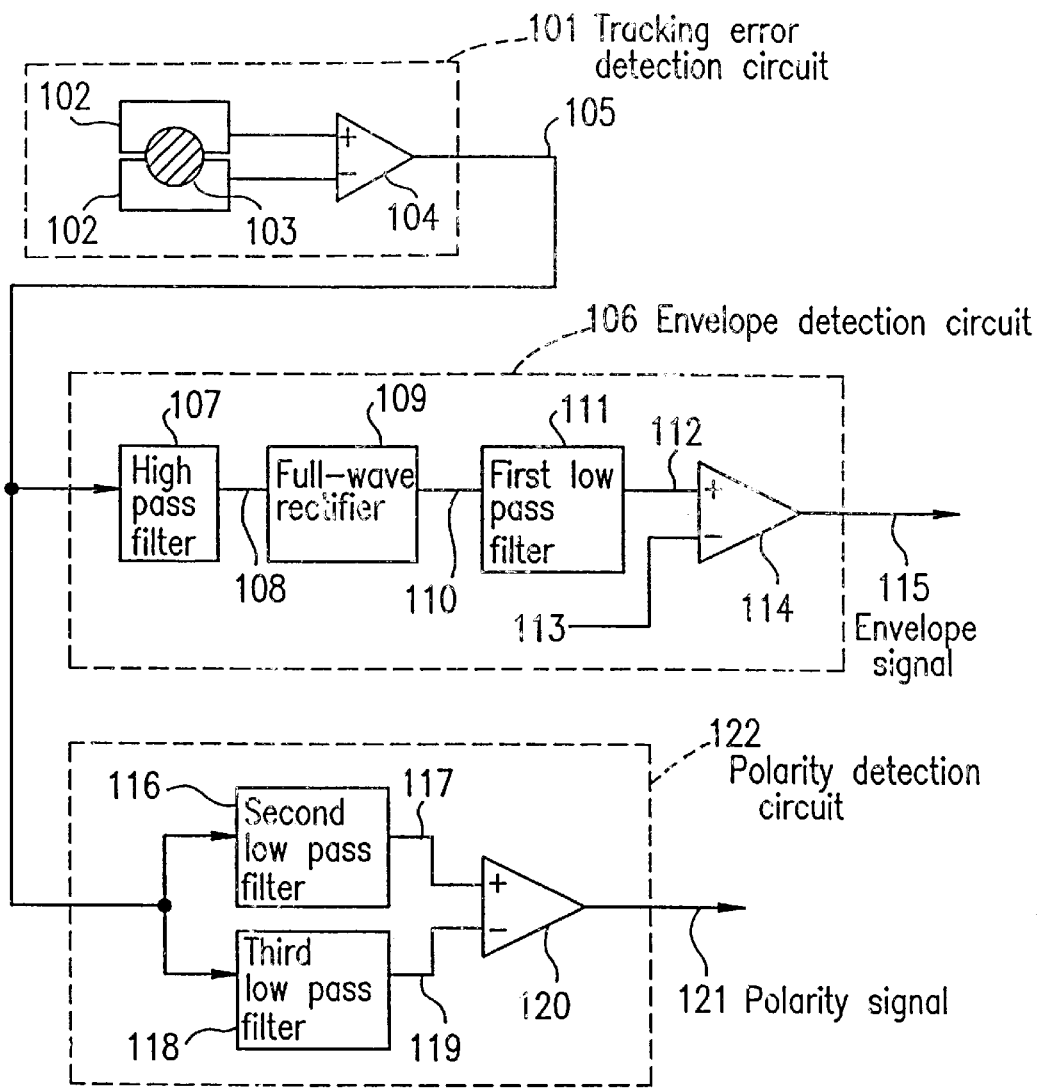
FIG. 18 is a block diagram showing an optical disk recording/reproduction apparatus including an ID detection circuit.

FIG. 18 is a block diagram showing an optical disk recording/reproduction apparatus having an ID detection circuit for an optical disk, illustrated as Example 9 of the present invention. In FIG. 18, a tracking error detection circuit 101 receives a light beam 103 reflected from an optical disk (not shown). The tracking error detection circuit 101 includes split detectors 102 for detecting tracking information and a differential amplifier 104 (which functions in a broad band width) for outputting a differential component between the detected signals from the respective split detectors 102 as a tracking error signal 105. The tracking error signal 105 is input to an envelope detection circuit 106 and a polarity detection circuit 122. The envelope detection circuit 106 includes: a high pass filter 107 for extracting a high frequency component of the tracking error signal 105; a full-wave rectifier 109 for subjecting the high frequency component 108 to full-wave rectification; a first low pass filter 111 for extracting a low frequency fluctuation component 112 from the high frequency component 110 which has been full-wave rectified; and a first comparator 114 for comparing the low frequency fluctuation component 112 and a reference voltage 113 and outputting an ID envelope signal 115. The polarity detection circuit 122 includes: a second low pass filter 116 for extracting a second low frequency component 117 from the tracking error signal 105; a third low pass filter 118 for extracting a third low frequency component 119 from the tracking error signal 105, the third low frequency component 119 having a smaller band width than that of the second low frequency component; and a second comparator 120 for comparing the second low frequency component 117 and the third low frequency component 119 and outputting an ID polarity signal 121.

FIGS. 19A to 19H are signal waveform diagrams illustrating the operations of the respective sections according to Example 9. The operation according to Example 9 will be described with reference to FIGS. 19A to 19H.

FIG. 19A is a diagram schematically showing a light beam scanning over a groove track of an optical disk for reproducing the groove track. The ○ symbol in FIG. 19A represents the light beam, and the hatched portions represent grooves. The ID sections are provided in a symmetrical manner in a middle position between a land and a groove and inserted in between tracks.

Figure 19B:
FIG. 19B is a diagram showing a tracking error signal obtained when scanning with a light beam.

FIG. 19B is a diagram showing the tracking error signal 105 obtained by scanning with the light beam. The tracking error signal 105 is obtained by reproducing the signal pits in an ID section as a high frequency component by using the broad-band differential amplifier 104. As for any signal recorded in the groove portions other than the ID sections, the detected components from both split detectors have the same phase, so that the recorded signal is cancelled in the differential amplifier 104 and cannot be detected as a tracking error signal.

Figure 19C:
FIG. 19C is diagram showing a signal obtained after a tracking error signal has passed through a high pass filter.

FIG. 19C shows a signal obtained after the tracking error signal 105 has passed through the high pass filter 107. The tracking error signal 105 is input to the high pass filter 107, and the high frequency component 108 of the tracking error signal 105 is output as shown in FIG. 19C. At this time, the gap in the tracking error signal between the ID sections, i.e., the d.c. component, and the low frequency fluctuation occurring due to servo disturbance are removed by the high pass filter 107.

Figure 19D:
FIG. 19D is a diagram showing a signal obtained by applying full-wave rectification with a full-wave rectifier to a signal which has passed through a high pass filter.

FIG. 19D shows a signal obtained by applying full-wave rectification with the full-wave rectifier 109 to the signal which has passed through the high pass filter 107. The high frequency component is full-wave rectified in the full-wave rectifier 109 and input to the first low pass filter 111.

Figure 19E:
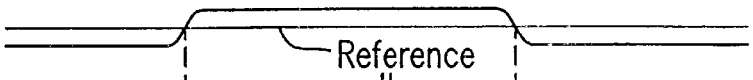
FIG. 19E is a diagram showing a signal obtained after a full-wave rectified signal has passed through a first low pass filter.
Figure 19F:
FIG. 19F is a diagram showing a signal which has passed through second and third low pass filters.
Figure 19G:
FIG. 19G is a diagram showing an envelope signal in an ID section.

FIG. 19E shows a signal obtained after the full-wave rectified signal has passed through the first low pass filter 111. The low frequency fluctuation component 112 which has been smoothed by the first low pass filter 111 is digitized by the first comparator 114 based on its relationship with the reference voltage 113 shown in FIG. 19E, so that the ID envelope signal 115 as shown in FIG. 19G is generated.

Figure 19H:
FIG. 19H is a diagram showing a polarity signal.

On the other hand, the tracking error signal 105 is input to the second low pass filter 116 and the third low pass filter 118, whereby the second low frequency component 117 and the third low frequency component 119 are respectively extracted. As shown in FIG. 19F, the gap in the tracking error signal between the ID sections, i.e., the d.c. component, remains intact in the extracted waveform, and due to the difference in the bands of the second and third low pass filters, the amplitude of the second low frequency component 117 always exceeds the amplitude of the third low frequency component 119. Furthermore, this relationship in amplitude is always true even if the reproduction light beam is in an off-track state. Accordingly, the ID polarity signal 121 indicating a change in the position of the ID section is output by the second comparator 120 comparing the second low frequency component signal 117 and the third low frequency component signal 119 (FIG. 19H). In this example, a falling edge is detected as a polarity signal in a period during which the envelope signal is valid.

Hereinafter, a polarity signal obtained in the case where the light beam is scanning over a land track of an optical disk in order to reproduce the-land track will be described.

FIG. 20A is a diagram schematically showing the case where the light beam is scanning over a land track of an optical disk in order to reproduce the land track. The description concerning the same operation as the above-described operation of scanning a groove track to obtain a polarity signal in Example 9 is omitted.

The case of land track scanning differs from the case of groove track scanning in the position of the gap in the tracking error signal shown in FIG. 20B (phase of the tracking error signal), and in the phases of the signals which are output from the second and third low pass filters shown in FIG. 20F. As in the case of scanning a groove track to obtain a polarity signal, Example 9 provides for the detection of a rising edge in a period during which the envelope signal is valid as a polarity signal.

Below are some desirable parameters in the implementation of the envelope detection circuit 106 and the polarity detection circuit 122 of Example 9. Experiments were conducted under conditions where the reproduction linear speed for the optical disk was 6 m/s; the data rate was 14 Mbps; and the ID period was 0.4 mm. The envelope signal 115 was accurately detected in the case where the high pass filter 107 had a cut-off frequency of about 1 MHz and the first low pass filter had a cut-off frequency of about 100 KHz, in spite of any dropouts (i.e., minute losses of the signals). Under the same conditions, the detection error of the polarity signal 121 became zero by ensuring that the second and third low pass filters had an about tenfold band difference where the cut-off frequency of the second low pass filter was about 10 KHz and the cut-off frequency of the third low pass filter was about 10 KHz. Thus, excellent detection results were obtained with respect to offsets of the light beam.

Figure 21:
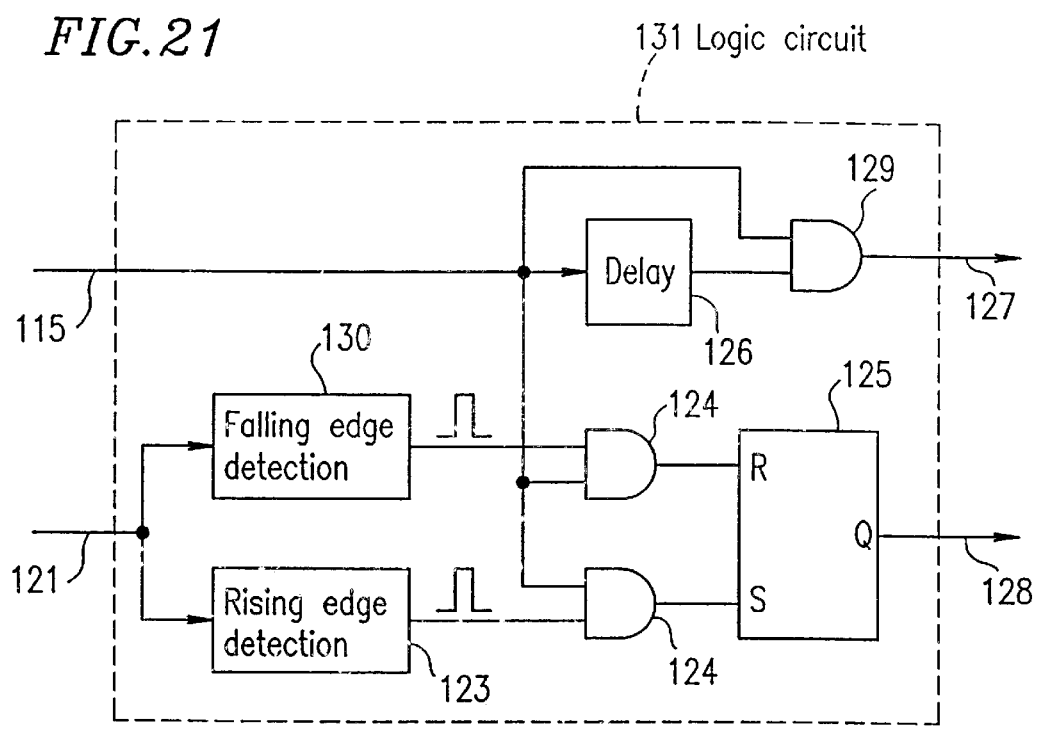
FIG. 21 is a diagram showing a logic circuit.
Figure 22:
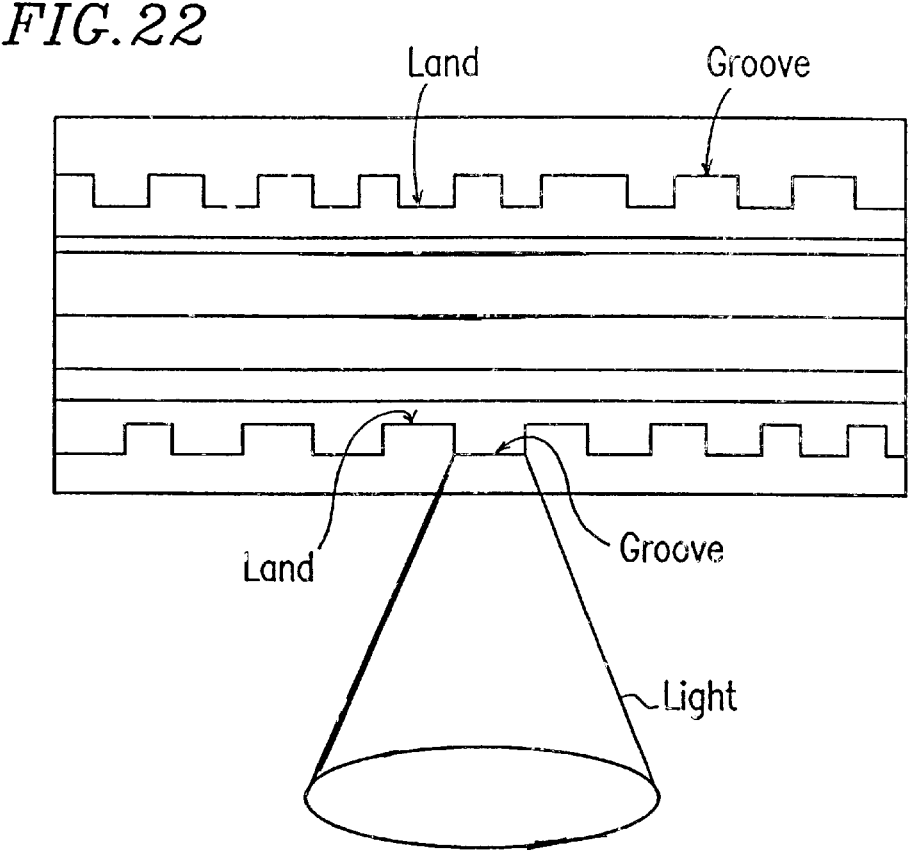
FIG. 22 is a diagram showing an exemplary optical disk of a land-groove recording type.
Figure 23:
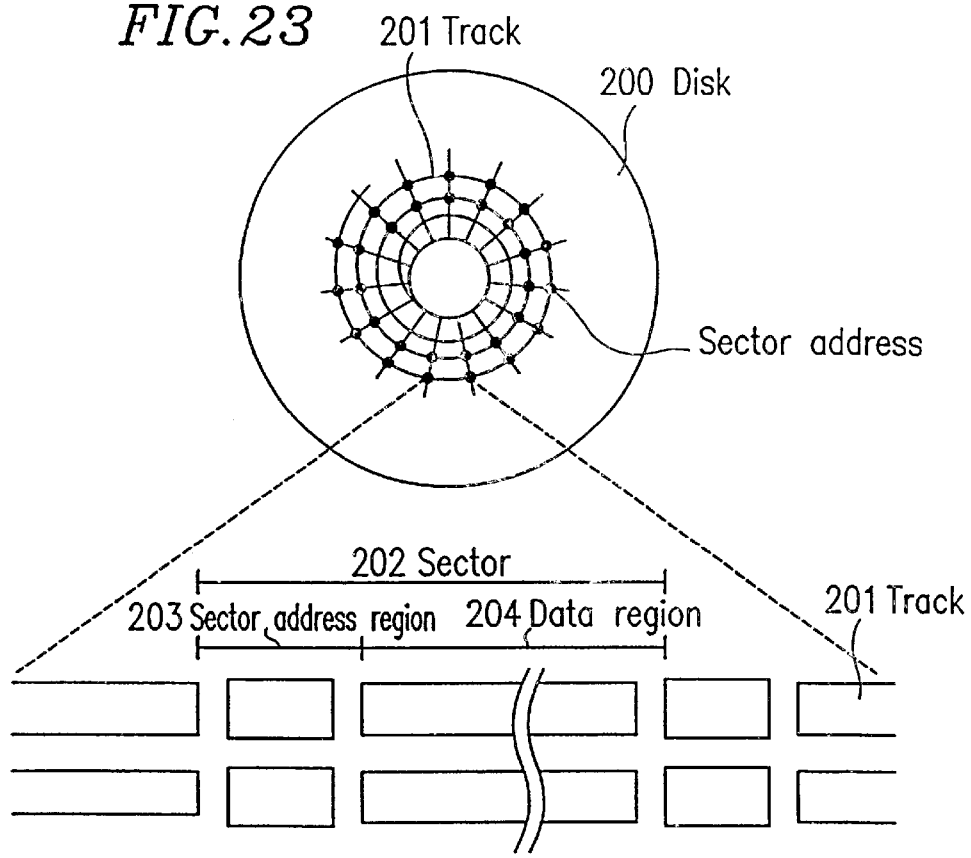
FIG. 23 is a diagram showing the track structure of a recording/reproduction optical disk.
Figure 24:
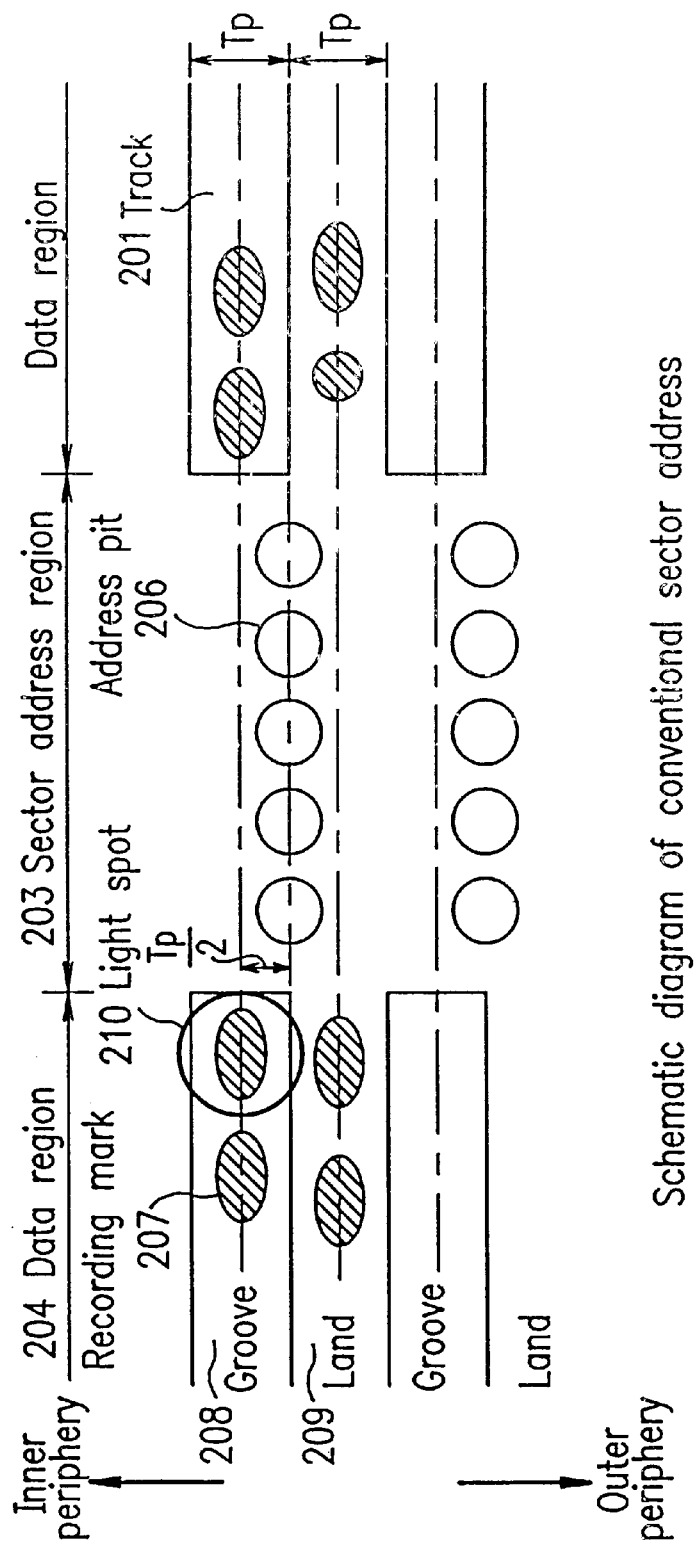
FIG. 24 is a schematic diagram showing a conventional sector address.
Figure 25:
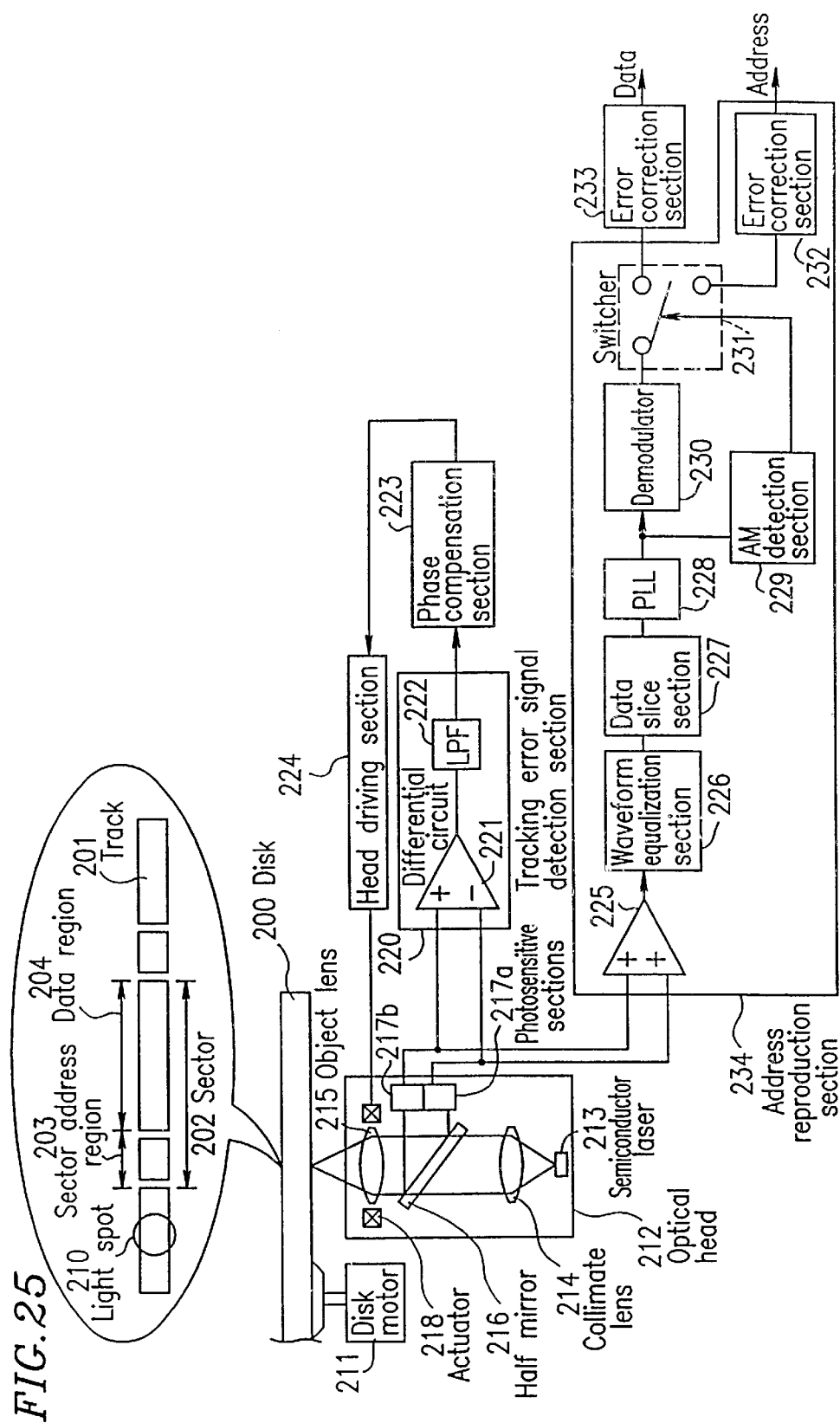
FIG. 25 is a block diagram showing a conventional optical disk recording/reproduction apparatus.
Figure 26:
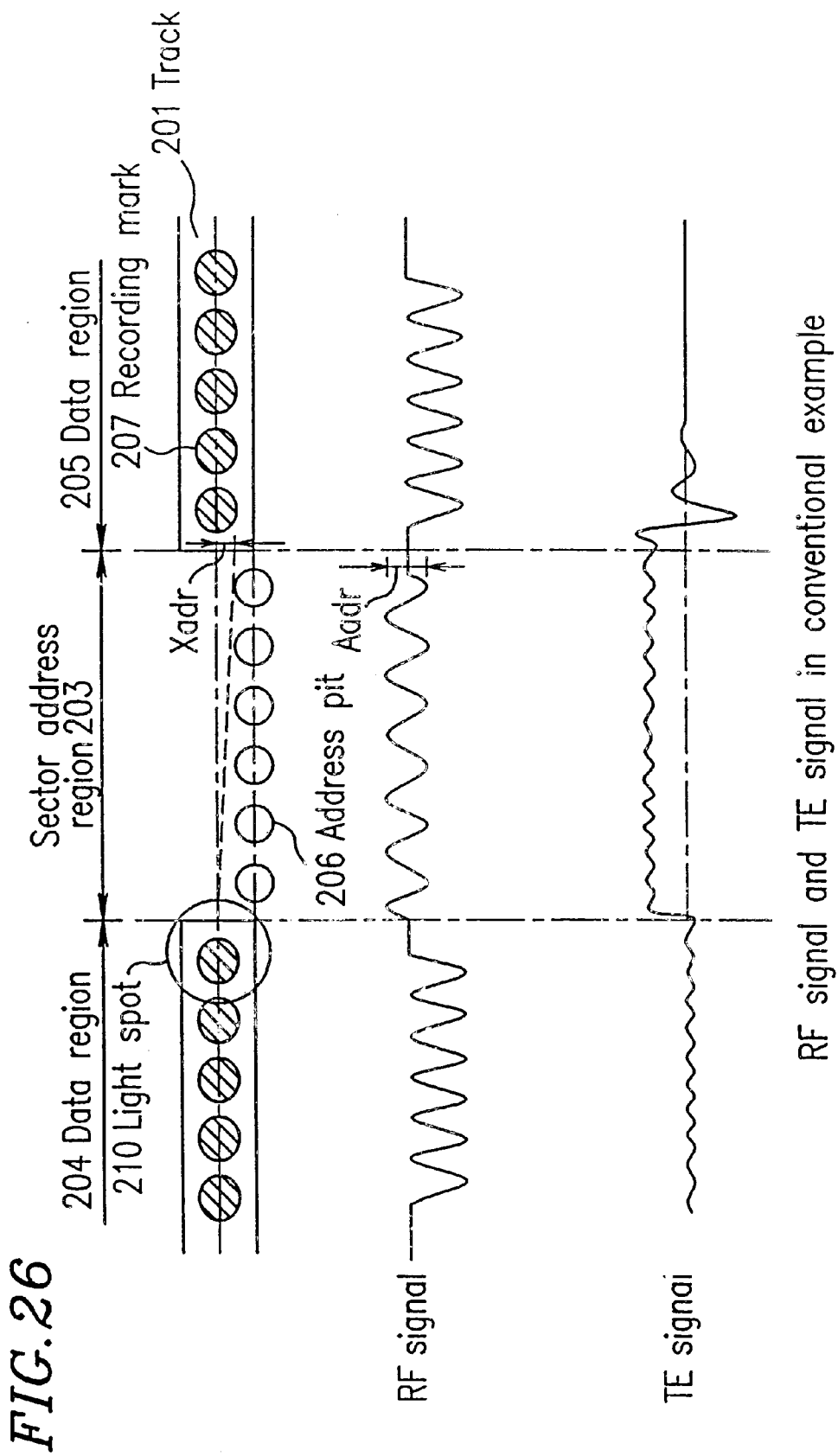
FIG. 26 is a diagram illustrating an RF signal and a TE signal in a conventional example.

A specific example of a logic circuit shown in FIG. 21 will be described. The input signals to the logic circuit 131 are the above-described envelope signal 115 and the polarity signal 121, and the output signals are the read gate 127 and a land-groove identification signal 128. The polarity signal 121 is input to a falling edge detection circuit 130 and a rising edge detection circuit 123, and these circuits output edge pulses. An AND gate 124 extracts the edge pulses only when the envelope signal 115 is valid. The extracted edge pulses are input to an RS flip-flop 125. The RS flip-flop 125 outputs the land-groove identification signal 128.

Hereinafter, a method for identifying lands from grooves will be described.

When a groove is being tracked, a falling edge of the polarity signal 121 is detected in a period during which the envelope signal 115 and a reset signal is input to the RS flip-flop 125 so that the land-groove identification signal 128 shifts to a LO level.

On the other hand, when a land is being tracked, a rising edge of the polarity signal 121 is detected in a period during which the envelope signal 115 and a set signal is input to the RS flip-flop 125 so that the land-groove identification signal 128 shifts to a HI level.

Thus, the detection as to land-groove is possible in accordance with the HI/LO levels of the land-groove identification signal. A delay 126 and an AND gate 129 remove the unnecessary pulse noise from the envelope signal 115, thereby generating the read gate 127, which serves as a signal reading reference for the optical disk drive apparatus.

The logic circuit is not limited to the circuit described above, but can have functions of pattern matching or error detection protection for generating a read gate and a land-groove identification signal based on an ID envelope signal and a polarity signal.

In accordance with the above-described configuration, the polarity detection accuracy does not decrease even in the case where the light beam is shifted with respect to a track center (i.e., an off-track state) the light beam in the present example. As a result, the present example makes it possible to accurately determine whether the light beam is on a land or a groove.

INDUSTRIAL APPLICABILITY

The optical disk of the present invention includes ID sections provided in a symmetrical manner in a middle position between a land and a groove. As a result, the positions and polarities of the ID sections can be detected with high accuracy even in the case where the reproduction light beam is offset or where the reproduced signal has dropouts. Thus, according to the present invention, the generation of a read gate as a reading reference and the identification of lands and grooves become stable, thereby greatly improving the reliability of the disk drive apparatus.

Another optical disk according to the present invention is capable of recording/reproduction on land tracks and groove tracks, and includes sector addresses provided so as to be shifted in a middle position between adjoining tracks. A plurality of address blocks constituting one sector address are grouped into address groups, where one group includes at least two or more address blocks; the address groups are disposed so that each address group alternately wobbles toward the inner periphery side and the outer periphery side with respect to a track center along the radius direction. Thus, the sector addresses can be securely read even if the light spot is off-tracked. Furthermore, the disturbance in tracking control due to level variation of a tracking error signal in a sector address region can be reduced.

In still another optical disk according to the present invention, address groups are provided where one group includes at least two or more address blocks, and a clock synchronization signal is added to the beginning portion of each address block, the clock synchronization signal for the first address block of the address group being longer than the clock synchronization signal for the other address block. Thus, the reproduction of the begging portion of the address group is stably performed. As a result, the synchronization with the read clock, the setting of the slice level for digitization, and the like can be securely performed. It is possible to properly demodulate the data recorded in the portions which are called later than the portions in which the clock synchronization signal is recorded.

In accordance with an optical disk recording/reproduction apparatus of the present invention, when reproducing wobbled address blocks, the address numbers which have been read can be corrected in accordance with overlapping sequential numbers, regardless of a land track or a groove track. As a result, different address numbers can be read for the respective address blocks within one sector address, whereby an accurate address value can be obtained.

In accordance with another optical disk recording/ reproduction apparatus of the present invention, a true off-tracking amount between the light spot and a track can be detected by detecting a difference between a tracking error signal or a reflected light amount signal in address blocks on the inner periphery side and a tracking error signal or a reflected light amount signal in address blocks on the outer periphery side. Furthermore, by correcting the tracking error signal using this off-tracking amount, a tracking control system can be realized which is capable of positioning the light spot so as to be always on the track center.

Thus, in accordance with another optical disk recording/ reproduction apparatus of the present invention, a broadband tracking error signal containing a high frequency component is detected in a tracking error detection circuit, and an ID envelope signal is detected by using a high pass filter, a full-wave rectifier, a first low pass filter, and a first comparator, based solely on ID sections within a tracking error signal. At this time, even if the data written on a track other than in the ID sections is reproduced, its amplitude does not appear in the tracking error signal detected by a differential amplifier, so that misdetection does not occur.

In accordance with still another optical recording/ reproduction apparatus of the present invention, the polarities of ID sections provided in a symmetrical manner between a land and a groove are detected by a second low pass filter, a third low pass filter, and a second comparator. At this time, even if the tracking error signal has an amplitude disturbance in an off-track state of the light beam, the direction of the polarity signal generated by the second and third low pass filters having different bands does not change. Moreover, since a read gate is generated from the envelope signal and the direction of the polarity signal is determined in a period during which the envelope signal is valid, it is possible to identify whether the light beam is tracking on a land or a groove.

What is claimed is:

1. An optical disk comprising a land track and a groove track, wherein each of the land track and the groove track includes a plurality of sectors, each of the plurality of sectors includes a sector address region and a data region, and the sector address region includes a plurality of address blocks, further wherein the sector address region includes a first address block group including a plurality of address blocks immediately adjacent to each other in a circumferential direction and a second address block group including a plurality of address blocks immediately adjacent to each other in the circumferential direction, each of the plurality of address blocks included in the first address block group includes data of a clock synchronization signal and an address number, each of the plurality of address blocks included in the second address block group includes data of a dock synchronization signal and an address number, the first address block group and the second address block group are disposed so as to be shifted oppositely in a radial direction with respect to a track central axis by substantially half of a track pitch, a length of data of the dock synchronization signal included in a leading address block among the plurality of address blocks included in the first address block group is greater than a length of data of the clock synchronization signal included in an address block other than the leading address block, among the plurality of address blocks included in the first address block group, and a length of data of the clock synchronization signal included in a leading address block among the plurality of address blocks included in the second address block group is greater than a length of data of the clock synchronization signal included in an address block other than the leading address block, among the plurality of address blocks included in the second address block group, wherein the length of data of the clock synchronization signals included in the leading address blocks of the first and second address block groups are equal and the length of data of the clock synchronization included in the address blocks other than the leading address block of the first and second address block groups are equal.

2. An optical disk recording/reproduction apparatus for an optical disk according to claim 1, the apparatus comprising:

a tracking error signal detection section for detecting a tracking error signal indicating an offset amount between a track and a light spot;

an outer periphery value sample-hold section for sampling and holding a level of the tracking error signal with respect to an address block disposed on an outer periphery side relative to the track central axis;

an inner periphery value sample-hold section for sampling and holding a level of the tracking error signal with respect to an address block disposed on an inner periphery side relative to the track central axis; and a differential section for deriving a difference between the level of the tracking error signal held by the outer periphery sample-hold section and the level of the tracking error signal held by the inner periphery sample-hold section.

3. An optical disk recording/reproduction apparatus for an optical disk comprising a land track and a groove track, wherein each of the land track and the groove track includes a plurality of sectors, each of the plurality of sectors includes a sector address region and a data region, and the sector address region includes a plurality of address blocks, further wherein the sector address region includes a first address block group including a plurality of address blocks immediately adjacent to each other in a circumferential direction and a second address block group including a plurality of address blocks immediately adjacent to each other in the circumferential direction, each of the plurality of address blocks included in the first address block group includes data of a clock synchronization signal and an address number, each of the plurality of address blocks included in the second address block group includes data of a clock synchronization signal and an address number, the first address block group and the second address block group are disposed so as to be shifted oppositely in a radial direction with respect to a track central axis by substantially half of a track pitch, a length of date of the clock synchronization signal included in a leading address block among the plurality of address blocks included in the first address block group is greater than a length of date of the clock synchronization signal included in an address block other than the leading address block, among the plurality of address blocks included in the first address block group, and a length of data of the clock synchronization signal included in a leading address block among the plurality of address blocks included in the second address block group is greater than a length of data of the clock synchronization signal included in an address block other than the leading address block, among the plurality of address blocks included in the second address block group, wherein the length of data of the clock synchronization signals included in the leading address blocks of the first and second address block groups are equal and the length of date of the clock synchronization included in the address blocks other than the leading address block of the first and second address block groups are equal, the apparatus comprising:
  a reflected light amount signal detection section for detecting a reflected light amount from the optical disk;
  an outer periphery value sample-hold section for sampling and holding a level of the reflected light amount signal with respect to an address block disposed on an outer periphery side relative to the track central axis;
  an inner periphery value sample-hold section for sampling and holding a level of the reflected light amount signal with respect to an address block disposed on an inner periphery side relative to the track central axis; and
  a differential section for deriving a difference between a level of the reflected light amount signal held by the outer periphery sample-hold section and a level of the reflected light amount signal held by the inner periphery sample-hold section.

* * * * *

UNITED STATES PATENT AND TRADEMARK OFFICE
CERTIFICATE OF CORRECTION

PATENT NO. : 6,438,096 B1
DATED : August 20, 2002
INVENTOR(S) : Yoshinari Takemura et al.

It is certified that error appears in the above-identified patent and that said Letters Patent is hereby corrected as shown below:

Column 26,
Lines 16 and 22, "dock" should be -- clock --; and
Lines 38-43, should be deleted.

Column 27,
Lines 23, 26 and 42, "date" should be -- data --; and
Lines 39-44, should be deleted.

Signed and Sealed this

Second Day of December, 2003

JAMES E. ROGAN
*Director of the United States Patent and Trademark Office*